(12) United States Patent
Busany et al.

(10) Patent No.: US 12,034,756 B2
(45) Date of Patent: Jul. 9, 2024

(54) ANALYTICAL ATTACK GRAPH DIFFERENCING

(71) Applicant: Accenture Global Solutions Limited, Dublin (IE)

(72) Inventors: Nimrod Busany, Tel Aviv (IL); Dan Klein, Rosh Ha'ayin (IL); Benny Rochwerger, Tel Aviv (IL)

(73) Assignee: Accenture Global Solutions Limited, Dublin (IE)

( * ) Notice: Subject to any disclaimer, the term of this patent is extended or adjusted under 35 U.S.C. 154(b) by 393 days.

(21) Appl. No.: 17/411,344

(22) Filed: Aug. 25, 2021

(65) Prior Publication Data
US 2022/0070202 A1 Mar. 3, 2022

Related U.S. Application Data

(60) Provisional application No. 63/071,498, filed on Aug. 28, 2020.

(51) Int. Cl.
*H04L 9/40* (2022.01)
(52) U.S. Cl.
CPC ...... *H04L 63/1433* (2013.01); *H04L 63/1441* (2013.01)
(58) Field of Classification Search
CPC ............. H04L 63/1433; H04L 63/1441; H04L 63/1425; G06F 21/577; G06F 16/9024
See application file for complete search history.

(56) References Cited

U.S. PATENT DOCUMENTS

| 5,521,910 A | 5/1996 | Matthews |
| 6,279,113 B1 | 8/2001 | Vaidya |

(Continued)

FOREIGN PATENT DOCUMENTS

| EP | 1559008 | 8/2005 |
| EP | 1768043 | 3/2007 |

(Continued)

OTHER PUBLICATIONS

3DS.com [online], "New Customer Experience," available on or before Aug. 7, 2020 via Internet Archive: Wayback Machine URL<https://web.archive.org/web/20200807204455/https://ifwe.3ds.com/transportation-mobility/new-customer-experience>, retrieved on Jul. 9, 2021, retrieved from URL<https://ifwe.3ds.com/transportation-mobility/new-customer-experience>, 9 pages.

(Continued)

*Primary Examiner* — Ali S Abyaneh
(74) *Attorney, Agent, or Firm* — Fish & Richardson P.C.

(57) ABSTRACT

Methods, systems, and computer-readable storage media for receiving data representative of two or more AAGs, providing an identifier for each element of each of the two or more AAGs, each identifier being unique within a respective AAG, at least one identifier being non-unique between the two or more AAGs, determining an attribute value for each element of each of the two or more AAGs, storing attribute value to element mappings in an attribute dictionary, providing a differenced AAG based on the attribute value to element mappings in the attribute dictionary, determining a set of remedial actions at least partially based on the differenced AAG, and executing one or more remedial actions in the set of remedial actions to reduce a cyber security risk to the enterprise network.

24 Claims, 7 Drawing Sheets

(56) References Cited

U.S. PATENT DOCUMENTS

| | | | |
|---|---|---|---|
| 6,487,666 B1 | 11/2002 | Shanklin et al. | |
| 7,540,025 B2 | 5/2009 | Tzadikario | |
| 7,703,138 B2 | 4/2010 | Desai et al. | |
| 7,904,962 B1 | 3/2011 | Jajodia et al. | |
| 8,099,760 B2 | 1/2012 | Cohen et al. | |
| 8,176,561 B1 | 5/2012 | Hurst et al. | |
| 8,656,493 B2 | 2/2014 | Capalik | |
| 8,881,288 B1 | 11/2014 | Levy et al. | |
| 9,256,739 B1 | 2/2016 | Roundy et al. | |
| 9,563,771 B2 | 2/2017 | Lang et al. | |
| 9,633,306 B2 | 4/2017 | Liu et al. | |
| 9,787,705 B1* | 10/2017 | Love | G06F 16/9024 |
| 10,084,804 B2 | 9/2018 | Kapadia et al. | |
| 10,291,478 B1* | 5/2019 | Hosamani | H04L 41/12 |
| 10,291,645 B1 | 5/2019 | Frantzen et al. | |
| 10,382,473 B1 | 8/2019 | Ashkenazy et al. | |
| 10,447,721 B2 | 10/2019 | Lasser | |
| 10,447,727 B1 | 10/2019 | Hecht | |
| 10,601,854 B2 | 3/2020 | Lokamathe et al. | |
| 10,642,840 B1 | 5/2020 | Attaluri et al. | |
| 10,659,488 B1 | 5/2020 | Rajasooriya et al. | |
| 10,771,492 B2 | 9/2020 | Hudis et al. | |
| 10,848,515 B1 | 11/2020 | Pokhrel et al. | |
| 10,868,825 B1 | 12/2020 | Dominessy et al. | |
| 10,873,533 B1 | 12/2020 | Ismailsheriff et al. | |
| 10,956,566 B2 | 3/2021 | Shu et al. | |
| 10,958,667 B1 | 3/2021 | Maida et al. | |
| 11,089,040 B2 | 8/2021 | Jang et al. | |
| 11,128,654 B1 | 9/2021 | Joyce et al. | |
| 11,159,555 B2 | 10/2021 | Hadar et al. | |
| 11,184,385 B2 | 11/2021 | Hadar et al. | |
| 11,232,235 B2 | 1/2022 | Hadar et al. | |
| 11,277,431 B2 | 3/2022 | Hassanzadeh et al. | |
| 11,281,806 B2 | 3/2022 | Hadar et al. | |
| 11,283,824 B1 | 3/2022 | Berger et al. | |
| 11,283,825 B2 | 3/2022 | Grabois et al. | |
| 11,411,976 B2 | 8/2022 | Basovskiy et al. | |
| 11,483,213 B2 | 10/2022 | Engelberg et al. | |
| 11,533,332 B2 | 12/2022 | Engelberg et al. | |
| 2005/0138413 A1 | 6/2005 | Lippmann et al. | |
| 2005/0193430 A1 | 9/2005 | Cohen et al. | |
| 2006/0037077 A1 | 2/2006 | Gadde et al. | |
| 2007/0198971 A1* | 8/2007 | Dasu | G06F 8/4432 |
| | | | 717/140 |
| 2008/0044018 A1 | 2/2008 | Scrimsher et al. | |
| 2008/0289039 A1 | 11/2008 | Rits et al. | |
| 2008/0301765 A1 | 12/2008 | Nicol et al. | |
| 2009/0077666 A1 | 3/2009 | Chen et al. | |
| 2009/0138590 A1 | 5/2009 | Lee et al. | |
| 2009/0307772 A1 | 12/2009 | Markham et al. | |
| 2009/0319248 A1 | 12/2009 | White et al. | |
| 2010/0058456 A1 | 3/2010 | Jajodia et al. | |
| 2010/0138925 A1 | 7/2010 | Barai et al. | |
| 2010/0174670 A1 | 7/2010 | Malik et al. | |
| 2011/0035803 A1 | 2/2011 | Lucangeli Obes et al. | |
| 2011/0061104 A1 | 3/2011 | Sarraute Yamada et al. | |
| 2011/0093916 A1 | 4/2011 | Lang et al. | |
| 2011/0093956 A1 | 4/2011 | Laarakkers et al. | |
| 2013/0097125 A1 | 4/2013 | Marvasti et al. | |
| 2013/0219503 A1 | 8/2013 | Amnon et al. | |
| 2014/0082738 A1 | 3/2014 | Bahl | |
| 2014/0173740 A1 | 6/2014 | Albanese et al. | |
| 2014/0245443 A1* | 8/2014 | Chakraborty | H04L 63/1425 |
| | | | 726/23 |
| 2015/0047026 A1 | 2/2015 | Neil et al. | |
| 2015/0106867 A1 | 4/2015 | Liang | |
| 2015/0199207 A1 | 7/2015 | Lin et al. | |
| 2015/0261958 A1 | 9/2015 | Hale et al. | |
| 2015/0326601 A1 | 11/2015 | Grondin et al. | |
| 2015/0350018 A1 | 12/2015 | Hui et al. | |
| 2016/0105454 A1 | 4/2016 | Li et al. | |
| 2016/0110434 A1* | 4/2016 | Kakaraddi | G06F 11/3452 |
| | | | 707/602 |
| 2016/0205122 A1 | 7/2016 | Bassett | |
| 2016/0277423 A1 | 9/2016 | Apostolescu et al. | |
| 2016/0292599 A1 | 10/2016 | Andrews et al. | |
| 2016/0301704 A1 | 10/2016 | Hassanzadeh et al. | |
| 2016/0301709 A1 | 10/2016 | Hassanzadeh et al. | |
| 2017/0012836 A1 | 1/2017 | Tongaonkar et al. | |
| 2017/0032130 A1 | 2/2017 | Joseph et al. | |
| 2017/0041334 A1 | 2/2017 | Kahn et al. | |
| 2017/0078322 A1 | 3/2017 | Seiver et al. | |
| 2017/0085595 A1 | 3/2017 | Ng et al. | |
| 2017/0163506 A1 | 6/2017 | Keller | |
| 2017/0230410 A1 | 8/2017 | Hassanzadeh et al. | |
| 2017/0318050 A1 | 11/2017 | Hassanzadeh et al. | |
| 2017/0324768 A1 | 11/2017 | Crabtree et al. | |
| 2017/0364702 A1 | 12/2017 | Goldfarb et al. | |
| 2017/0366416 A1 | 12/2017 | Beecham et al. | |
| 2018/0013771 A1 | 1/2018 | Crabtree et al. | |
| 2018/0103052 A1 | 4/2018 | Choudhury et al. | |
| 2018/0152468 A1 | 5/2018 | Nor et al. | |
| 2018/0159890 A1 | 6/2018 | Warnick et al. | |
| 2018/0183827 A1 | 6/2018 | Zorlular et al. | |
| 2018/0255077 A1 | 9/2018 | Paine | |
| 2018/0255080 A1 | 9/2018 | Paine | |
| 2018/0295154 A1 | 10/2018 | Crabtree et al. | |
| 2018/0367548 A1 | 12/2018 | Stokes, III et al. | |
| 2019/0052663 A1 | 2/2019 | Lee et al. | |
| 2019/0052664 A1 | 2/2019 | Kibler et al. | |
| 2019/0132344 A1 | 5/2019 | Lem et al. | |
| 2019/0141058 A1 | 5/2019 | Hassanzadeh et al. | |
| 2019/0182119 A1 | 6/2019 | Ratkovic et al. | |
| 2019/0188389 A1 | 6/2019 | Peled et al. | |
| 2019/0230129 A1 | 7/2019 | Digiambattista et al. | |
| 2019/0312898 A1 | 10/2019 | Verma et al. | |
| 2019/0319987 A1 | 10/2019 | Levy et al. | |
| 2019/0354689 A1* | 11/2019 | Li | G06F 21/563 |
| 2019/0362279 A1 | 11/2019 | Douglas | |
| 2019/0373005 A1 | 12/2019 | Bassett | |
| 2020/0014718 A1 | 1/2020 | Joseph Durairaj et al. | |
| 2020/0042328 A1 | 2/2020 | Gupta | |
| 2020/0042712 A1 | 2/2020 | Foo et al. | |
| 2020/0045069 A1 | 2/2020 | Nanda et al. | |
| 2020/0099704 A1 | 3/2020 | Lee et al. | |
| 2020/0112487 A1 | 4/2020 | Inamdar et al. | |
| 2020/0128047 A1 | 4/2020 | Biswas et al. | |
| 2020/0137104 A1 | 4/2020 | Hassanzadeh et al. | |
| 2020/0175175 A1 | 6/2020 | Hadar et al. | |
| 2020/0177615 A1 | 6/2020 | Girabois et al. | |
| 2020/0177616 A1 | 6/2020 | Hadar et al. | |
| 2020/0177617 A1 | 6/2020 | Hadar et al. | |
| 2020/0177618 A1 | 6/2020 | Hassanzadeh et al. | |
| 2020/0177619 A1 | 6/2020 | Hadar et al. | |
| 2020/0220892 A1* | 7/2020 | Gibson | H04L 63/1441 |
| 2020/0272972 A1 | 8/2020 | Harry et al. | |
| 2020/0296137 A1 | 9/2020 | Crabtree et al. | |
| 2020/0311630 A1 | 10/2020 | Risoldi et al. | |
| 2020/0351295 A1 | 11/2020 | Nhlabatsi et al. | |
| 2020/0358804 A1 | 11/2020 | Crabtree et al. | |
| 2021/0006582 A1 | 1/2021 | Yamada et al. | |
| 2021/0014265 A1 | 1/2021 | Hadar et al. | |
| 2021/0099490 A1 | 4/2021 | Crabtree et al. | |
| 2021/0105294 A1 | 4/2021 | Kruse et al. | |
| 2021/0168175 A1 | 6/2021 | Crabtree et al. | |
| 2021/0173711 A1 | 6/2021 | Crabtree et al. | |
| 2021/0218770 A1 | 7/2021 | Ben-Yosef et al. | |
| 2021/0248443 A1 | 8/2021 | Shu et al. | |
| 2021/0273978 A1 | 9/2021 | Hadar et al. | |
| 2021/0281591 A1* | 9/2021 | Furtak | H04L 41/142 |
| 2021/0288995 A1 | 9/2021 | Attar et al. | |
| 2021/0336035 A1 | 10/2021 | Akella et al. | |
| 2021/0409426 A1 | 12/2021 | Engelberg et al. | |
| 2021/0409439 A1 | 12/2021 | Engelberg et al. | |
| 2022/0014445 A1 | 1/2022 | Engelberg et al. | |
| 2022/0014534 A1 | 1/2022 | Basovskiy et al. | |
| 2022/0021698 A1 | 1/2022 | Hadar et al. | |
| 2022/0038491 A1 | 2/2022 | Hadar et al. | |
| 2022/0051111 A1 | 2/2022 | Hadar et al. | |
| 2022/0124115 A1 | 4/2022 | Grabois et al. | |
| 2022/0129590 A1 | 4/2022 | Hadar et al. | |
| 2022/0131894 A1 | 4/2022 | Hassanzadeh et al. | |
| 2022/0150270 A1 | 5/2022 | Klein et al. | |
| 2022/0182406 A1 | 6/2022 | Inokuchi | |

(56) References Cited

U.S. PATENT DOCUMENTS

| | | |
|---|---|---|
| 2022/0188460 A1 | 6/2022 | Hadar et al. |
| 2022/0263855 A1 | 8/2022 | Engelberg et al. |
| 2022/0337617 A1 | 10/2022 | Basovskiy et al. |
| 2023/0021961 A1 | 1/2023 | Engelberg et al. |
| 2023/0034910 A1 | 2/2023 | Engelberg et al. |
| 2023/0067128 A1 | 3/2023 | Engelberg et al. |
| 2023/0067777 A1 | 3/2023 | Hadar et al. |
| 2023/0076372 A1 | 3/2023 | Engelberg et al. |

FOREIGN PATENT DOCUMENTS

| | | |
|---|---|---|
| EP | 2385676 | 11/2011 |
| EP | 2816773 | 12/2014 |
| EP | 3644579 | 4/2020 |
| EP | 3664411 | 6/2020 |
| WO | WO 2018/002484 | 1/2018 |
| WO | WO 2020/242275 | 12/2020 |

OTHER PUBLICATIONS

Abraham et al., "Cyber Security Analytics: A Stochastic Model for Security Quantification Using Absorbing Markov Chains," Journal of Communications, Dec. 2014, 9(12):899-907.

Alvarenga et al., "Discovering Attack Strategies Using Process Mining," Presented at Proceedings of The Eleventh Advanced International Conference on Telecommunications, Brussels, Belgium, Jun. 21-26, 2015, 119-125.

Amar et al., "Using finite-state models for log differencing," Proceedings of the 2018 26th ACM Joint Meeting on European Software Engineering Conference and Symposium on the Foundations of Software Engineering (ESEC/FSE 2018), Lake Buena Vista, Florida, Nov. 4-9, 2018, 49-59.

Atoum et al., "A holistic cyber security implementation framework," Information Management & Computer Security, Jul. 2014, 22(3):251-264.

Barik et al., "Attack Graph Generation and Analysis Techniques," Defence Science Journal, Nov. 2016, 66(6):559-567.

Barrère et al., "Naggen: a Network Attack Graph GENeration Tool—IEE CNS 17 Poster," 2017 IEEE Conference on Communications and Network Security, Oct. 2017, Las Vegas, NV, USA, 378-379.

Bonacich, "Power and Centrality: A Family of Measures," American Journal of Sociology, Mar. 1987, 92(5):1170-1182.

Borgatti et al., "A Graph-theoretic perspective on centrality," Social Networks, Oct. 2006, 28(4):466-484.

Challenge.org [online], "Incorporating digital twin into internet cyber security—creating a safer future," May 2018, retrieved on Jul. 9, 2021, retrieved from URL<https://www.challenge.org/insights/digital-twin-cyber-security/>, 10 pages.

Chen et al., "Distributed Attack Modeling Approach Based on Process Mining and Graph Segmentation," Entropy, Sep. 2020, 22(9):1026, 21 pages.

Cohen-Addad et al., "Hierarchical Clustering: Objective Functions and Algorithms," Journal of the ACM, Jun. 2019, 66(4):26, 42 pages.

Coltellese et al., "Triage of IoT Attacks Through Process Mining," Presented at Proceedings of on the Move to Meaningful Internet Systems Conference 2019, Rhodes, Greece, Oct. 21-25, 2019; Lecture Notes in Computer Science, Oct. 2019, 11877:326-344.

EP Search Report in European Application No. EP 19212981, dated Mar. 4, 2020, 6 pages.

EP Search Report in European Application No. EP13290145, dated Nov. 12, 2013, 2 pages.

EP Search Report in European Application No. EP19212974, dated Feb. 14, 2020, 8 pages.

EP Search Report in European Application No. EP19212976, dated Feb. 14, 2020, 8 pages.

EP Search Report in European Application. No. 21159421.3, dated Jun. 30, 2021, 11 pages.

EP Search Report in European Application. No. EP20185251, dated Oct. 21, 2020, 7 pages.

Fielder et al., "Decision support approaches for cyber security investment," Decision Support Systems, Jun. 2016, 86:13-23.

Foundations of Databases, 1st ed., Abiteboul et al. (eds.), 1995, Chapter 12, 38 pages.

Fundamentals of Business Process Management, 2nd ed., Dumas et al. (eds.), 2018, 546 pages.

GE.com [online], "Predix Platform," available on or before Nov. 16, 2018 via Internet Archive: Wayback Machine URL<https://web.archive.org/web/20181116005032/https://www.ge.com/digital/iiot-platform>, retrieved on Jul. 9, 2021, retrieved from URL<https://www.ge.com/digital/iiot-platform>, 6 pages.

Gergeleit et al., "Modeling Security Requirements and Controls for an Automated Deployment of Industrial IT Systems," Kommunikation und Bildverarbeitung in der Automation. Technologien für die intelligente Automation (Technologies for Intelligent Automation), Jan. 14, 2020, 12:217-231.

Grieves, "Virtually Intelligent Product Systems: Digital and Physical Twins", Complex Systems Engineering: Theory and Practice, Jul. 2019, 256:175-200.

Hadar et al., "Big Data Analytics on Cyber Attack Graphs for Prioritizing Agile Security Requirements", Proceedings of the 2019 IEEE 27th International Requirements Engineering Conference, Sep. 23-27, 2019, Jeju Island, Kora, 330-339.

Hadar et al., "Cyber Digital Twin Simulator for Automatic Gathering and Prioritization of Security Controls Requirements," Proceedings of the 2020 IEEE 28th International Requirements Engineering Conference, Aug. 31-Sep. 4, 2020, Zurich, Switzerland, 250-259.

Hansen et al., "Model-in-the-Loop and Software-in-the-Loop Testing of Closed-Loop Automotive Software with Arttest," Informatik, 2017, 13 pages.

Hasan et al., "Towards Optimal Cyber Defense Remediation in Energy Delivery Systems", Proceedings of 2019 IEEE Global Communications Conference, Dec. 9-13, 2019, Waikoloa, Hawaii, 7 pages.

Hofner et al., "Dijkstra, Floyd and Warshall meet Kleene," Formal Aspects of Computing, Jul. 2012, 24(4-6):459-476.

Husák et al., "Survey of Attack Projection, Prediction, and Forecasting in Cyber Security," IEEE Communications Surveys & Tutorials, Sep. 24, 2018, 21(1):640-660.

Idika et al., "Extending attack graph-based security metrics and aggregating their application," IEEE Transactions on Dependable and Secure Computing, Jan./Feb. 2012, 9(1):75-85.

IEEE, "IEEE Standard for extensible Event Stream (XES) for Achieving Interoperability in Event Logs and Event Stream," IEEE Std 1849™-2016, Sep. 22, 2016, 50 pages.

IEEE.org [online], "This Car Runs on Code," Feb. 1, 2009, retrieved on Jul. 9, 2021, retrieved from URL<https://spectrum.ieee.org/transportation/systems/this-car-runs-on-code>, 5 pages.

Ingols et al., "Practical Attack Graph Generation for Network Defense," 2006 22nd Annual Computer Security Applications Conference (ACSAC'06), Miami Beach, Florida, Dec. 11-15, 2006, 10 pages.

International Organization for Standardization, "International Standard: ISO/IEC 27001," ISO/IEC 27001:2013(E), Oct. 1, 2013, 29 pages.

Joint Task Force Transformation Initiative, "Security and Privacy Controls for Federal Information Systems and Organizations," National Institute of Standards and Technology Special Publication 800-53, Revision 4, Jan. 22, 2015, 462 pages.

Khouzani et al., "Scalable min-max multi-objective cyber-security optimization over probabilistic attack graphs", European Journal of Operational Research, Nov. 1, 2019, 278(3):894-903.

Li et al., "Cluster security research involving the modeling of network exploitations using exploitation graphs," Proceedings of the IEEE International Symposium on Cluster Computing and the Grid, Singapore, May 16-19, 2006, 11 pages.

Lippmann et al., "Validating and restoring defense in depth using attack graphs," Proceedings of the Military Communications Conference, Washington, DC, USA, Oct. 23-25, 2006, 10 pages.

(56) References Cited

OTHER PUBLICATIONS

Lu et al., "Ranking attack graphs with graph neural networks," Proceedings of the 5th International Conference on Information Security Practice and Experience, Xi'an, China, Apr. 13-15, 2009; Lecture Notes in Computer Science, Apr. 2009, 5451:345-359.

Manning Free Content Center [online], "Building Your Vocabulary," dated May 19, 2017, retrieved on Jun. 3, 2020, retrieved from URL <https://freecontent.manning.com/building-your-vocabulary/>, 10 pages.

MaschinenMarkt.international [online], "Digital twin in the automobile industry," Aug. 1, 2019, retrieved on Jul. 9, 2021, retrieved from URL<https://www.maschinenmarkt.international/digital-twin-in-the-automobile-industry-a-851549/>, 3 pages.

Mashable.com [online], "Ford ready to innovate, but not at the expense of customer needs," May 31, 2016, retrieved on Jul. 9, 2021, retrieved from URL<https://mashable.com/article/mark-fields-ford-codecon>, 7 pages.

Mehta et al., "Ranking attack graphs," Proceedings of the International Conference on Recent Advances in Intrusion Detection, Hamburg, Germany, Sep. 20-22, 2006; Lecture Notes in Computer Science, Sep. 2006, 4219:127-144.

Murata, "Petri Nets: Properties, Analysis and Applications," Proceedings of the IEEE, Apr. 1989, 77(4):541-580.

Narmeen Zakaria Bawany; DDoS Attack Detection and Mitigation Using SON: Methods, Practices, and Solutions; Springer-2017; p. 425-441.

National Institute of Standards and Technology [online], "National Vulnerability Database," last updated Jun. 2, 2020, retrieved on Jun. 3, 2020, retrieved from URL<https://nvd.nist.gov/>, 4 pages.

Neo4j.com [online], "Random Walk," available on or before Aug. 6, 2020 via Internet Archive: Wayback Machine URL<https://web.archive.org/web/20200806193136/https://neo4j.com/docs/graph-data-science/current/alpha-algorithms/random-walk/>, retrieved on Jul. 28, 2021, retrieved from URL<https://neo4j.com/docs/graph-data-science/current/alpha-algorithms/random-walk/>, 7 pages.

Neo4j.com [online], "Yen's K-Shortest Paths," available on or before Aug. 6, 2020 via Internet Archive: Wayback Machine URL<https://web.archive.org/web/20200806185626/https://neo4j.com/docs/graph-data-science/current/alpha-algorithms/yen-s-k-shortest-path/>, retrieved on Jul. 28, 2021, retrieved from URL<https://web.archive.org/web/20200806185626/https://neo4j.com/docs/graph-data-science/current/alpha-algorithms/yen-s-k-shortest-path/>, 5 pages.

Networks: An Introduction, Newman (ed.), May 2010, 789 pages.

Noel et al., "CyGraph: Graph-Based Analytics and Visualization for Cybersecurity," Handbook of Statistics, Jan. 2016, 35:117-167.

Ortalo et al., "Experimenting with quantitative evaluation tools for monitoring operational security," IEEE Transactions on Software Engineering, Sep./Oct. 1999, 25(5):633-650.

Ou et al., "A Scalable Approach to Attack Graph Generation," Proceedings of the 13th ACM Conference on Computer and Communication Security, Oct. 2006, 336-345.

Ou et al., "MulVAL: A Logic-based Network Security Analyzer," 14th USENIX Security Symposium, Aug. 2005, Baltimore, MD, USA, 16 pages.

Phillips et al., "A graph-based system for network-vulnerability analysis," Proceedings of the 1998 Workshop on New Security Paradigms, Charlottesville, Virginia, Sep. 22-26, 1998, 71-79.

PM4Py.de [online], "DFG: Process Discovery using Directly-Follows Graphs," available on or before Mar. 7, 2019 via Internet Archive: Wayback Machine URL<https://web.archive.org/web/20190307062454/http://pm4py.pads.rwth-aachen.de/documentation/process-discovery/dfg/>, retrieved on Jul. 28, 2021, retrieved from URL<https://web.archive.org/web/20190307062454/http://pm4py.pads.rwth-aachen.de/documentation/process-discovery/dfg/>, 4 pages.

PM4Py.de [online], "Process Discovery," available on or before Jun. 26, 2020 via Internet Archive: Wayback Machine URL<https://web.archive.org/web/20200626094921/https://pm4py.fit.fraunhofer.de/documentation#discovery>, retrieved on Jul. 28, 2021, retrieved from URL<https://pm4py.fit.fraunhofer.de/documentation#discovery>, 5 pages.

Process Mining, 1st ed., van der Aalst, 2011, Chapters 5-6, 63 pages.

Purvine et al., "A Graph-Based Impact Metric for Mitigating Latheral Movement Cyber Attacks", Automated Descision Making for Active Cyber Defence, Oct. 2016, pp. 45-52.

Q. Liu et al., "Latte: Large-Scale Lateral Movement Detection," MILCOM 2018—2018 IEEE Military Communications Conference (MILCOM), 2018, pp. 1-6, doi: 10.1109/MILCOM.2018.8599748. (Year: 2018).

Schatz et al., "Economic valuation for information security investment: a systematic literature review," Information Systems Frontiers, Apr. 18, 2016, 19:1205-1228.

Shandilya et al., "Use of Attack Graphs in Security Systems", Hindawi Journal of Computer Networks and Communications, Oct. 20, 2014, 2014:818957, 14 pages.

Shi et al., "Normalized Cuts and Image Segmentation," IEEE Transactions on Pattern Analysis and. Machine Intelligence, Aug. 2000, 22(8):888-905.

Siemens.com [online], "From vehicle design to multi-physical simulations," available on or before Jul. 26, 2019 via Internet Archive: Wayback Machine URL<https://web.archive.org/web/20190726044643/https://new.siemens.com/global/en/markets/automotive-manufacturing/digital-twin-product.html>, retrieved on Jul. 9, 2021, retrieved from URL<https://new.siemens.com/global/en/markets/automotive-manufacturing/digital-twin-product.html>, 11 pages.

SMMT.co.uk [online], "Role of Digital Twin in Automotive Industry," Dec. 17, 2018, retrieved on Jul. 9, 2021, retrieved from URL<https://www.smmt.co.uk/2018/12/role-of-digital-twin-in-automotive-industry/>, 9 pages.

Sourceforge.net [online], "XSB," last updated Oct. 29, 2017, retrieved on Jun. 3, 2020, retrieved from URL <http://xsb.sourceforge.net/>, 2 pages.

Stanek et al., "Method of comparing graph differencing algorithms for software differencing," 2008 IEEE International Conference on Electro/Information Technology, Ames, Iowa, May 18-20, 2008, 482-487.

Strom et al., "MITRE ATT&CK™: Design and Philosophy", The MITRE Corporation, Jul. 2018, 37 pages.

Swiler et al., "A graph-based network-vulnerability analysis system," Sandia National Laboratories, 1997, Tech. Rep. SAND97-3010/1, 25 pages.

TechCrunch.com [online], "Tesla is rolling out its Navigate on Autopilot feature," Oct. 27, 2018, retrieved on Jul. 9, 2021, retrieved from URL<https://techcrunch.com/2018/10/26/tesla-is-rolling-out-its-navigate-on-autopilot-feature/>, 17 pages.

The Fourth Industrial Revolution, 1st. ed., Schwab, Jan. 2017, 218 pages.

The MITRE Corporation [online], "MITRE ATT&CK," last updated May 27, 2020, retrieved on Jun. 3, 2020, retrieved from URL <https://attack.mitre.org/>, 3 pages.

Ullah et al., "Towards Modeling Attacker's Opportunity for Improving Cyber Resilience in Energy Delivery Systems", Resilience Week, Aug. 2018, pp. 100-107.

Van Der Aalst et al., "Causal Nets: A Modeling Language Tailored towards Process Discovery," Presented at Proceedings of CONCUR 2011—Concurrency Theory, Aachen, Germany, Sep. 6-9, 2011; Lecture Notes in Computer Science, Sep. 2011, 6901:28-42.

Vehicle Power Management, 1st ed., Zhang et al.(eds.), Aug. 2011, Chapter 10, 27 pages.

Wang et al., "A Network Vulnerability Assessment Method Based on Attack Graph," 2018 IEEE 4th International Conference on Computer and Communications, Dec. 7-10, 2018, Chengdu, China, 1149-1154.

Wang et al., "Exploring Attack Graph for Cost-benefit Security Hardening: A Probabilistic Approach," Computers & Security, Feb. 2013, 32:158-169.

Ward et al., "Threat Analysis and Risk Assessment in Automotive Cyber Security," SAE Int. J. Passeng. Cars Electron. Electr. Systems, May 2013, 6(2):507-513.

Wikipedia.org [online], "5G," last updated Jul. 9, 2021, retrieved on Jul. 9, 2021, retrieved from URL<https://en.wikipedia.org/wiki/5G>, 29 pages.

(56) References Cited

OTHER PUBLICATIONS

Wikipedia.org [online], "Active Directory," last updated Jun. 1, 2020, retrieved on Jun. 3, 2020, retrieved from URL <https://en.wikipedia.org/wiki/Active_Directory>, 14 pages.
Wikipedia.org [online], "Backward Chaining," last updated Nov. 16, 2019, retrieved on Jun. 3, 2020, retrieved from URL <https://en.wikipedia.org/wiki/Backward_chaining>, 3 pages.
Wikipedia.org [online], "Breadth-first search," last updated Jul. 21, 2021, retrieved on Jul. 28, 2021, retrieved from URL<https://en.wikipedia.org/wiki/Breadth-first_search>, 6 pages.
Wikipedia.org [online], "Cartesian Product," last updated Feb. 28, 2020, retrieved on Jun. 3, 2020, retrieved from URL <https://en.wikipedia.org/wiki/Cartesian_product>, 9 pages.
Wikipedia.org [online], "Centrality," last updated May 29, 2020, retrieved on Jun. 3, 2020, retrieved from URL <https://en.wikipedia.org/wiki/Centrality>, 15 pages.
Wikipedia.org [online], "Centrality," last updated Oct. 18, 2020, retrieved on Oct. 26, 2020, retrieved from URL<https://en.wikipedia.org/wiki/Centrality>, 15 pages.
Wikipedia.org [online], "Common Vulnerabilities and Exposures," last updated Jul. 6, 2021, retrieved on Jul. 9, 2021, retrieved from URL<https://en.wikipedia.org/wiki/Common_Vulnerabilities_and_Exposures>, 5 pages.
Wikipedia.org [online], "Common Vulnerability Scoring System," last updated Jun. 21, 2021, retrieved on Jul. 9, 2021, retrieved from URL<https://en.wikipedia.org/wiki/Common_Vulnerability_Scoring_System>, 7 pages.
Wikipedia.org [online], "Depth-first search," last updated Jun. 16, 2021, retrieved on Jul. 28, 2021, retrieved from URL<https://en.wikipedia.org/wiki/Depth-first_search>, 8 pages.
Wikipedia.org [online], "Digital twin," last updated Jul. 8, 2021, retrieved on Jul. 9, 2021, retrieved from URL<https://en.wikipedia.org/wiki/Digital_twin>, 13 pages.
Wikipedia.org [online], "Eigenvector centrality," last updated Dec. 1, 2020 retrieved on Jan. 11, 2021, retrieved from URL<https://en.wikipedia.org/wiki/Eigenvector_centrality>, 4 pages.
Wikipedia.org [online], "Flood Fill," last updated Dec. 24, 2019, retrieved on Jun. 3, 2020, retrieved from URL <https://en.wikipedia.org/wiki/Flood_fill>, 7 pages.
Wikipedia.org [online], "Floyd-Warshall algorithm," last updated Jan. 5, 2021, retrieved on Jan. 11, 2021, retrieved from URL<https://en.wikipedia.org/wiki/Floyd%E2%80%93Warshall_algorithm>, 7 pages.
Wikipedia.org [online], "Forward Chaining," last updated Nov. 18, 2019, retrieved on Jun. 3, 2020, retrieved from URL <https://en.wikipedia.org/wiki/Forward_chaining>, 3 pages.
Wikipedia.org [online], "Look-ahead (backtracking)," last updated May 23, 2020, retrieved on Jun. 3, 2020, retrieved from URL <https://en.wikipedia.org/wiki/Look-ahead_(backtracking)>, 3 pages.
Wikipedia.org [online], "SCADA," last updated Jun. 2, 2020, retrieved on Jun. 3, 2020, retrieved from URL <https://en.wikipedia.org/wiki/SCADA>, 12 pages.
Wikipedia.org [online], "Sigmoid function," last updated Dec. 25, 2020, retrieved on Jan. 11, 2021, retrieved from URL<https://en.wikipedia.org/wiki/Sigmoid_function>, 4 pages.
Wikipedia.org [online], "SWOT analysis," last updated Oct. 20, 2020, retrieved on Oct. 26, 2020, retrieved from URL<https://en.wikipedia.org/wiki/SWOT_analysis>, 8 pages.
Wikipedia.org [online], "Traffic congestion," last updated Oct. 5, 2020, retrieved on Oct. 26, 2020, retrieved from URL<https://en.wikipedia.org/wiki/Traffic_congestion>, 24 pages.
Wikipedia.org [online], "Traffic flow," last updated Oct. 19, 2020, retrieved on Oct. 26, 2020, retrieved from URL<https://en.wikipedia.org/wiki/Traffic_flow>, 41 pages.
Wikipedia.org [online], "Zero-day (computing)," last updated Oct. 16, 2020, retrieved on Oct. 26, 2020, retrieved from URL<https://en.wikipedia.org/wiki/Zero-day_(computing)>, 8 pages.
X. Li, C. Zhang, T. Jung, J. Qian and L. Chen, "Graph-based privacy-preserving data publication," IEEE INFOCOM 2016—The 35th Annual IEEE International Conference on Computer Communications, 2016, pp. 1-9, doi: 10.1109/IN F000M.2016.7524584. (Year: 2016).
Xie et al., "Using Bayesian Networks for Cyber Security Analysis," Proceedings of the 2010 IEEE/IFIP International Conference on Dependable Systems & Networks, Jun. 28-Jul. 1, 2010, Chicago, Illinois, 211-220.
Yi et al., "Overview on attack graph generation and visualization technology," 2013 International Conference on Anti-Counterfeiting, Security and Identification (ASID), Shanghai, China, Oct. 25-27, 2013, 6 pages.
You et al., "A Review of Cyber Security Controls from an ICS Perspective," Proceedings of 2018 International Conference on Platform Technology and Service (PlatCon), Jan. 29-31, 2018, Jeju, South Korea, 5 pages.
Zeng et al., "Survey of Attack Graph Analysis Methods from the Perspective of Data and Knowledge Processing," Hindawi Security and Communication Networks, Dec. 26, 2019, 2019:2031063, 17 pages.
Zhang et al., "Co-simulation framework for design of time-triggered cyber physical systems," 2013 ACM/IEEE International Conference on Cyber-Physical Systems (ICCPS), Philadelphia, Pennsylvania, Apr. 8-11, 2013, 119-128.
Zhang et al., "Optimal Decision-Making Approach for Cyber Security Defense Using Game Theory and Intelligent Learning," Security and Communication Networks, Dec. 23, 2019, 2019:3038586, 17 pages.
Zhao et al., "Attack graph analysis method for large scale network security hardening," J. Front. Comput. Sci. Technology, 2018, 12(2):263-273 (with English Abstract).
EP Extended Search Report in European Appln. No. 22193272.6, dated Jan. 25, 2023, 8 pages.
Abraham et al. "A Predictive Framework for Cyber Security Analytics Using Attack Graphs." International Journal of Computer Networks & Communications (IJCNC). vol. 7, No. 1, Jan. 2015. (Year: 2015).
EP Extended Search Report in European Appln. No. 21191752.1, dated Jan. 4, 2022, 8 pages.
CyberSecurity Works.com [online], "MITRE Mapping of CISA KEVs and its Challenges," Jun. 29, 2022, retrieved on Oct. 4, 2022, retrieved from URL<https://cybersecurityworks.com/blog/cisa/mitre-mapping-of-cisa-kevs-and-its-challenges.html>, 6 pages.
Cycognito.com [online], "Identifying and Managing Vulnerabilities on All Your Attacker-Exposed Assets, All the Time: Benefits of the CyCognito Platform for Vulnerability Management," available on or before Oct. 22, 2020 via Internet Archive: Wayback Machine URL<https://web.archive.org/web/20201022120625/https://www.cycognito.com/vulnerability-management>, retrieved on Oct. 4, 2022, retrieved from URL<https://www.cycognito.com/vulnerability-management>, 15 pages.
Das et al., "V2W-BERT: A Framework for Effective Hierarchical Multiclass Classification of Software Vulnerabilities," CoRR, submitted on Feb. 23, 2021, arXiv:2102.11498v1, 11 pages.
GitHub.com [online], "ALFA-group/BRON," available on or before Nov. 23, 2021 via Internet Archive: Wayback Machine URL<https://web.archive.org/web/20211123023700/https://github.com/ALFA-group/BRON>, retrieved on Oct. 4, 2022, retrieved from URL<https://github.com/ALFA-group/BRON>, 5 pages.
Grigorescu et al., "CVE2ATT&CK: BERT-Based Mapping of CVEs to MITRE ATT&CK Techniques," Algorithms, Aug. 31, 2022, 15(9):314, 22 pages.
Mitre.org [online], "CAPEC: Common Attack Pattern Enumerations and Classifications," available on or before Jul. 21, 2007 via Internet Archive: Wayback Machine URL<https://web.archive.org/web/20070721234158/https://capec.mitre.org/>, retrieved on Oct. 4, 2022, retrieved from URL<https://capec.mitre.org/>, 2 pages.
Mitre.org [online], "CWE: Common Weakness Enumeration," available on or before Oct. 9, 2006 via Internet Archive: Wayback Machine URL<https://web.archive.org/web/20061009060144/https://cwe.mitre.org/>, retrieved on Oct. 4, 2022, retrieved from URL<https://cwe.mitre.org/>, 1 page.

(56) References Cited

OTHER PUBLICATIONS

W3.org [online], "SWRL: A Semantic Web Rule Language Combining OWL and RuleML," May 21, 2004, retrieved on Oct. 4, 2022, retrieved from URL<https://www.w3.org/Submission/SWRL/>, 24 pages.
Chen Zhong, Towards Agile Cyber Analysis: Leveraging Visualization as Functions in Collaborative Visual Analytics, IEEE:2017, pp. 1-2.
EP Extended Search Report in European Appln. No. 22187514.9, dated Nov. 29, 2022, 7 pages.
Brazhuk, "Towards automation of threat modeling based on a semantic model of attack patterns and weaknesses," arXiv, Dec. 8, 2021, arXiv:2112.04231v1, 14 pages.
EP Extended Search Report in European Appln. No. 22157487.4, dated Jun. 9, 2022, 10 pages.
Hemberg et al., "BRON—Linking Attack Tactics, Techniques, and Patterns with Defensive Weaknesses, Vulnerabilities and Affected Platform Configurations," arXiv, Oct. 1, 2020, arXiv:2010.00533v1, 14 pages.
Hemberg et al., "Using a Collated Cybersecurity Dataset for Machine Learning and Artificial Intelligence," arXiv, Aug. 5, 2021, arXiv:2108.02618v1, 5 pages.
Horrocks et al., "SWRL: A Semantic Web Rule Language Combining OWL and RuleML," W3C Member Submission, May 21, 2004, 24 pages.
Neo4j.com [online], "Topological link prediction," available on or before May 17, 2020, via Internet Archive: Wayback Machine URL<https://web.archive.org/web/20200517111258/https://neo4j.com/docs/graph-data-science/current/algorithms/linkprediction/>, retrieved on Jun. 14, 2022, retrieved from URL<https://neo4j.com/docs/graph-data-science/current/algorithms/linkprediction/>, 2 pages.
Rossi et al., "Knowledge Graph Embedding for Link Prediction: A Comparative Analysis," arXiv, Feb. 3, 2020, arXiv:2002.00819v1, 42 pages.
Wikipedia.org [online], "Natural language processing," last updated Jun. 10, 2022, retrieved on Jun. 14, 2022, retrieved from URL<https://en.wikipedia.org/wiki/Natural_language_processing>, 13 pages.
Kaloroumakis et al., "Toward a Knowledge Graph of Cybersecurity Countermeasures," Technical Report, The MITRE Corporation, 2021, 11 pages.
MITRE.org [online], "D3FEND," available on or before Jun. 22, 2021 via Internet Archive: Wayback Machine URL<https://web.archive.org/web/20210622142005/https://d3fend.mitre.org/>, retrieved on Jul. 13, 2022, retrieved from URL<https://d3fend.mitre.org/>, 3 pages.
MITRE.org [online], "Digital Artifact Ontology," available on or before Jun. 25, 2021 via Internet Archive: Wayback Machine URL<https://web.archive.org/web/20210625024718/https://d3fend.mitre.org/dao>, retrieved on Jul. 13, 2022, retrieved from URL<https://d3fend.mitre.org/dao/>, 3 pages.
MITRE.org [online], "Service Application," available on or before Jun. 25, 2021 via Internet Archive: Wayback Machine URL<https://web.archive.org/web/20210625024952/https://d3fend.mitre.org/dao/artifact/d3f:ServiceApplication/>, retrieved on Jul. 13, 2022, retrieved from URL<https://d3fend.mitre.org/dao/artifact/d3f:ServiceApplication/>, 1 page.
Wikipedia.org [online], "Reachability," last updated Oct. 22, 2021, retrieved on Jul. 13, 2022, retrieved from URL<https://en.wikipedia.org/wiki/Reachability>, 5 pages.
Almeida et al., "An ontological analysis of the notion of community in the RM-ODP enterprise language," Computer Standards & Interfaces, Mar. 2013, 35(3):257-268.
Annane et al., "BBO: BPMN 2.0 based ontology for business process representation," Presented at Proceedings of the 20th European Conference on Knowledge Management (ECKM 2019), Lisbonne, Portugal, Sep. 5-6, 2019, 49-59.
Ashton et al., "That 'internet of things' thing," RFID Journal, Jun. 22, 2009, 1 page.
Borgo et al., "Ontological Foundations of DOLCE," Theory and Applications of Ontology: Computer Applications, Aug. 5, 2010, 279-295.
Burger et al., "Scaling to the end of silicon with edge architectures," Computer, Jul. 2004, 37(7):44-55.
Cravero, "Big data architectures and the internet of things: A systematic mapping study," IEEE Latin America Transactions, Apr. 2018, 16(4):1219-1226.
Daniele et al., "An ontological approach to logistics," Enterprise Interoperability: Research and Applications in the Service-oriented Ecosystem, Oct. 11, 2013, 199-213.
Degen et al., "Gol: toward an axiomatized upper-level ontology," Presented at Proceedings of the International Conference on Formal Ontology in Information Systems, Ogunquit, Maine, USA, Oct. 17-19, 2001, 34-46.
Duarte et al., "Towards an Ontology of Requirements at Runtime," Formal Ontology in Information Systems, Jan. 2016, 283:255-268.
El Saddik, "Digital Twins: The Convergence of Multimedia Technologies," IEEE MultiMedia, Apr.-Jun. 2018, 25(2):87-92.
Gailly et al., "Ontological Reengineering of the REA-EO using UFO," Presented at Proceedings of the International Workshop on Ontology-Driven Software Engineering, Orlando, FL, USA, Oct. 2009, 15 pages.
Gandomi et al., "Beyond the hype: Big data concepts, methods, and analytics," International Journal of Information Management, Apr. 2015, 35(2):137-144.
Genovese, "Data mesh: the newest paradigm shift for a distributed architecture in the data world and its application," Thesis for the degree of Computer Engineering, Politecnico di Torino, 2021, 76 pages.
Giunchiglia et al., "Lightweight Ontologies," Technical Report DIT-07-071, University of Trento, Oct. 2007, 10 pages.
Gomez-Perez et al., "Ontology languages for the Semantic Web," IEEE Intelligent Systems, Feb. 2002, 17(1):54-60.
Guarino, "Formal Ontology in Information Systems," Presented at Proceedings of the 1st International Conference, Trento, Italy, Jun. 6-8, 1998, 3-15.
Guizzardi et al., "An Ontology-Based Approach for Evaluating the Domain Appropriateness and Comprehensibility Appropriateness of Modeling Languages," MoDELS, 2005, 691-705.
Guizzardi, "On Ontology, ontologies, Conceptualizations, Modeling Languages, and (Meta)Models," Presented at Proceedings of the 2007 conference on Databases and Information Systems IV: Selected Papers from the Seventh International Baltic Conference, Amsterdam, Netherlands, Jun. 5, 2007, 18 pages.
Guizzardi, "Ontological Foundations for Structural Conceptual Models," Thesis for the degree of Doctor, University of Twente, 2005, 441 pages.
Guizzardi, "Ontology, Ontologies and the "I" of FAIR," Data Intelligence, Jan. 1, 2020, 2(1-2):181-191.
Guizzardi, "The role of foundational ontology for conceptual modeling and domain ontology representation," Presented at Proceedings of the 7th International Baltic Conference on Databases and Information Systems, Vilnius, Lithuania, Jul. 3-6, 2006, 9 pages.
Hassani et al., "Artificial Intelligence (AI) or Intelligence Augmentation (IA): What Is the Future?," AI, Apr. 12, 2020, 1(2):143-155.
Herre, "General Formal Ontology (GFO): A Foundational Ontology for Conceptual Modelling," Theory and Applications of Ontology: Computer Applications, Aug. 12, 2010, 297-345.
Jacobsen et al., "FAIR Principles: Interpretations and Implementation Considerations," Data Intelligence, Jan. 1, 2020, 2(1-2):10-29.
Machado et al., "Data Mesh: Concepts and Principles of a Paradigm Shift in Data Architectures," Procedia Computer Science, 2022, 196:263-271.
Machado et al., "Data-Driven Information Systems: The Data Mesh Paradigm Shift," Presented at Proceedings of the 29th International Conference on Information Systems Development, Valencia, Spain, Sep. 8-10, 2021, 6 pages.
Makridakis, "The forthcoming artificial intelligence (ai) revolution: Its impact on society and firms," Futures, Jun. 2017, 90:46-60.

(56) References Cited

OTHER PUBLICATIONS

Martins et al., "A framework for conceptual characterization of ontologies and its application in the cybersecurity domain," Software and Systems Modeling, Jul. 2, 2022, 21:1437-1464.

Martins et al., "Conceptual Characterization of Cybersecurity Ontologies," The Practice of Enterprise Modelling, Nov. 18, 2020, 323-338.

Mathis, "Data lakes," Datenbank-Spektrum, Oct. 6, 2017, 17(3):289-293.

Monino, "Data Value, Big Data Analytics, and Decision-Making," Journal of the Knowledge Economy, Aug. 20, 2016, 256-267.

Sales et al., "Ontological anti-patterns in taxonomic structures," Presented at Proceedings of ONTOBRAS 2019: XII Seminar on Ontology Research in Brazil, Porto Alegre, Brazil, Sep. 2-5, 2019, 13 pages.

Sitton-Candanedo et al., "A review of edge computing reference architectures and a new global edge proposal," Future Generation Computer Systems, Oct. 2019, 99:278-294.

Tan et al., "Future internet: The Internet of Things," Presented at Proceedings of the 2010 3rd International Conference on Advanced Computer Theory and Engineering (ICACTE), Chengdu, China, Aug. 20-22, 2010,.

Uschold et al., "Ontologies: Principles, methods and applications," The Knowledge Engineering Review, Jan. 1996, 11(2):93-136.

Van Heijst et al., "Using explicit ontologies in KBS development," International Journal of Human-Computer Studies, Feb. 1997, 46(2-3):183-292.

Wand et al., "On the deep structure of information systems," Information Systems Journal, Jul. 1995, 5(3):203-223.

Wang et al., "Big data analytics in cyber security: network traffic and attacks," Journal of Computer Information Systems, Jan. 2020, 61(3):1-8.

Wu et al., "A service-oriented architecture for business intelligence," Presented at Proceedings of the IEEE International Conference on Service-Oriented Computing and Applications (SOCA '07), Newport Beach, CA, USA, Jun. 19-20, 2007, 279-285.

* cited by examiner

ANALYTICAL ATTACK GRAPH DIFFERENCING

CROSS-REFERENCE TO RELATED APPLICATION

This application claims the benefit of and priority to U.S. Prov. App. No. 63/071,498 filed on Aug. 28, 2020, which is expressly incorporated herein by reference in the entirety.

BACKGROUND

Computer networks are susceptible to attack by malicious users (e.g., hackers). For example, hackers can infiltrate computer networks in an effort to obtain sensitive information (e.g., user credentials, payment information, address information, social security numbers) and/or to take over control of one or more systems. To defend against such attacks, enterprises use security systems to monitor occurrences of potentially adverse events occurring within a network, and alert security personnel to such occurrences. For example, one or more dashboards can be provided, which provide lists of alerts that are to be addressed by the security personnel.

Modern computer networks are largely segregated and often deployed with diverse cyber defense mechanisms, which makes it challenging for an attacker (hacker) to gain direct access to a target (e.g., administrator credentials). This pattern is commonly seen in industrial control systems (ICSs) where a layered architecture ensures that targets are not in close proximity to the perimeter. Despite the presence of a layered architecture, the spate of attacks is increasing rapidly and span from large enterprises to critical infrastructure (CINF) networks. Due to the potential severe damage and cost experienced by a victim, CINFs have been intentionally targeted and have suffered from significant losses when successfully exploited.

In an effort to defend against cyber-attacks, so-called analytical attack graphs (AAGs) can be generated, which represent potential lateral movements of adversaries within computer networks. An AAG can be used to understand how a computer network can be hacked and undesirable consequences that can result. Accordingly, AAGs can be described as an important tool in developing anti-hacker defenses. For example, an AAG can be used to identify the most vulnerable components within a computer network and can be used to evaluate fixes of vulnerabilities that the AAG reveals (e.g., by fixing a limited number of issues, any adversary attack on the computer network, or on certain components in the computer network can be stopped).

By definition, AAGs are graph data structures that are processed using computing resources (e.g., processors, memory). Graph processing presents technical challenges in that it is resource-intensive. For example, AAGs are relatively large in size, particularly for large, complex enterprise networks, which requires significant memory and processing power for graph processing of an AAG. This is complicated by the fact that, in cyber-security, AAGs are frequently generated and processed for cyber-security analytics to keep up with the dynamics of enterprise networks. Resource-intensive graph processing presents other technical challenges, such as hindering scalability.

SUMMARY

Implementations of the present disclosure are directed to analytical attack graphs (AAGs) for enterprise-wide cyber-security. More particularly, implementations of the present disclosure are directed to AAG differencing to represent changes in enterprise networks. As described in further detail herein, AAG differencing enables generation of differenced graphs that can be at least partially representative of one or more remedial measures that can be applied to an enterprise network. Example differenced graphs include a differenced AAG (DAAG) graph and a many DAAG (MDAAG) graph. In some examples, a set of remedial actions can be identified using the differenced graphs, and one or more remedial actions can be executed to mitigate risk to the enterprise network.

In some examples, implementations of the present disclosure are provided within an agile security platform that determines asset vulnerability of enterprise-wide assets including cyber-intelligence and discovery aspects of enterprise information technology (IT) systems and operational technology (OT) systems, asset value, potential for asset breach and criticality of attack paths towards target(s) including hacking analytics of enterprise IT/OT systems.

In some implementations, actions include receiving data representative of two or more AAGs, providing an identifier for each element of each of the two or more AAGs, each identifier being unique within a respective AAG, at least one identifier being non-unique between the two or more AAGs, determining an attribute value for each element of each of the two or more AAGs, storing attribute value to element mappings in an attribute dictionary, providing a differenced AAG based on the attribute value to element mappings in the attribute dictionary, determining a set of remedial actions at least partially based on the differenced AAG, and executing one or more remedial actions in the set of remedial actions to reduce a cyber security risk to the enterprise network. Other implementations of this aspect include corresponding systems, apparatus, and computer programs, configured to perform the actions of the methods, encoded on computer storage devices.

These and other implementations can each optionally include one or more of the following features: providing a differenced AAG includes aligning the two or more AAGs by identifying equivalent nodes and identifying equivalent edges between the two or more AAGs, and executing a set of functions to provide a set of changed nodes and a set of changed edges; identifying nodes as equivalent nodes includes determining that the nodes are associated with the same predicate and have the same arguments; identifying edges as equivalent edges includes determining that the nodes have the same source node and the same target node; the set of functions includes a node addition function, a node removal function, an edge addition function, and an edge removal function; each node and each edge of the differenced AAG is assigned an attribute based on a respective attribute value, the attribute visually representing a difference between the two or more AAGs in a visualization of the differenced AAG; the differenced AAG represents one or more differences between two AAGs; and the differenced AAG includes a many differenced AAG that represents one or more differences between three or more AAGs.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
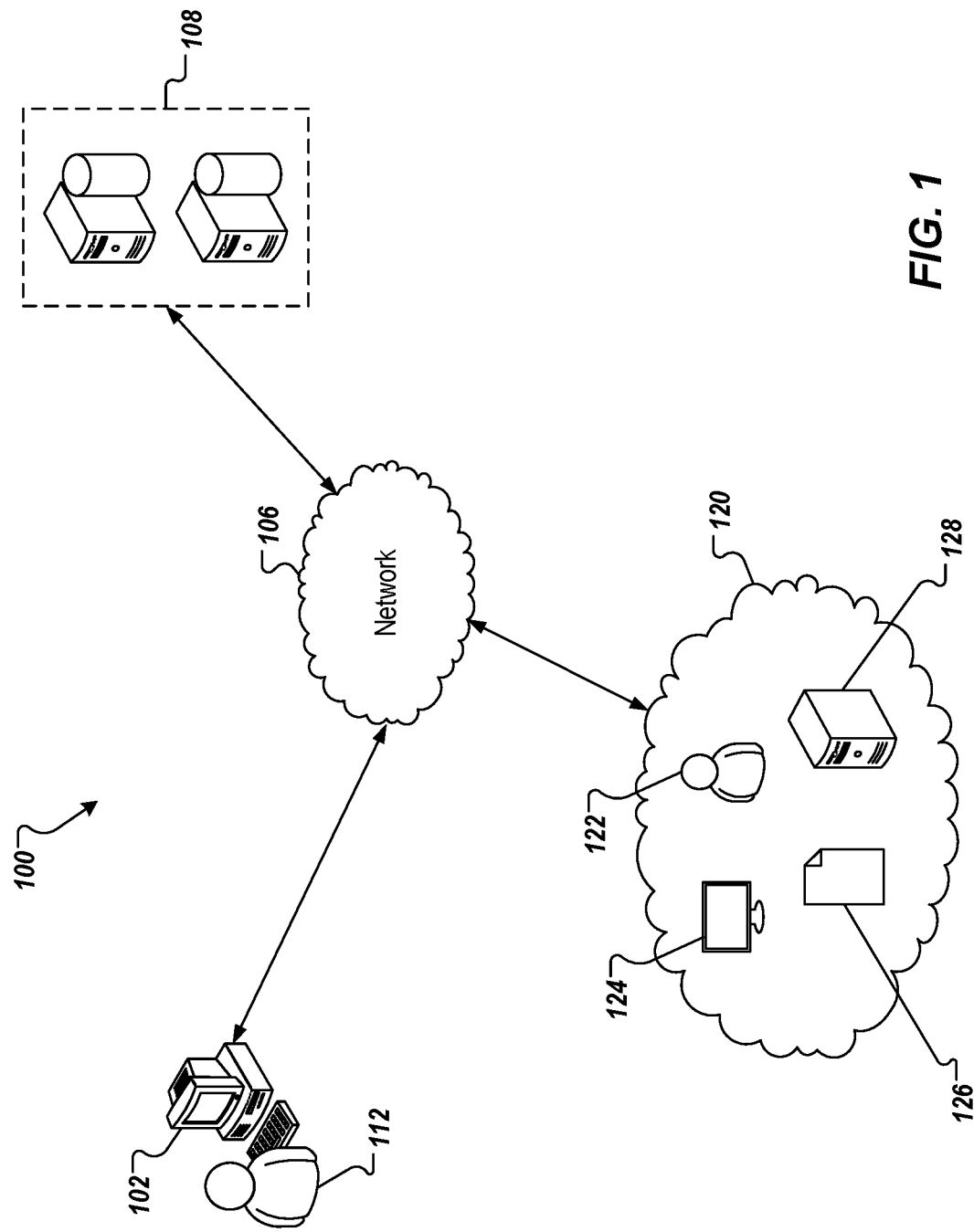
FIG. 1 depicts an example architecture that can be used to execute implementations of the present disclosure.

Implementations of the present disclosure are directed to analytical attack graphs (AAGs) for enterprise-wide cyber-security. More particularly, implementations of the present disclosure are directed to AAG differencing to represent changes in enterprise networks. As described in further detail herein, AAG differencing enables generation of differenced graphs that can be at least partially representative of one or more remedial measures that can be applied to an enterprise network. Example differenced graphs include a differenced AAG (DAAG) graph and a many DAAG (MDAAG) graph. In some examples, a set of remedial actions can be identified using the differenced graphs, and one or more remedial actions can be executed to mitigate risk to the enterprise network.

Accordingly, implementations of the present disclosure enable a shift from analysis of a single AAG to analysis and comparison of multiple AAGs in a time- and resource-efficient manner. In comparing multiple AAGs, the difference between the AAGs, the differenced graph can reveal vulnerabilities that were added, were removed or that persisted across multiple AAGs and/or effects that one or more remedial measures would have, if applied to an enterprise network. In this manner, analysis of potential remedial measures can be time- and resource-efficiently performed to select one or more remedial measures for execution within the enterprise network. Time- and resource-efficiencies are realized in that a differenced graph identifies differences between AAGs, reducing the time and resources required to process discern changes to an AAG in response to a stimulus (e.g., execution of a remedial action).

In some examples, implementations of the present disclosure are provided within an agile security platform that determines asset vulnerability of enterprise-wide assets including cyber-intelligence and discovery aspects of enterprise information technology (IT) systems and operational technology (OT) systems, asset value, potential for asset breach and criticality of attack paths towards target(s) including hacking analytics of enterprise IT/OT systems.

In some implementations, actions include receiving data representative of two or more AAGs, providing an identifier for each element of each of the two or more AAGs, each identifier being unique within a respective AAG, at least one identifier being non-unique between the two or more AAGs, determining an attribute value for each element of each of the two or more AAGs, storing attribute value to element mappings in an attribute dictionary, providing a differenced AAG based on the attribute value to element mappings in the attribute dictionary, determining a set of remedial actions at least partially based on the differenced AAG, and executing one or more remedial actions in the set of remedial actions to reduce a cyber security risk to the enterprise network.

To provide context for implementations of the present disclosure, and as introduced above, modern computer networks are largely segregated and often deployed with diverse cyber defense mechanisms, which makes it challenging for an attacker (hacker) to gain direct access to a target (e.g., administrator credentials). This pattern is commonly seen in industrial control system (ICSs) where a layered architecture ensures that targets are not in close proximity to the perimeter. Despite the presence of a layered architecture, the spate of attacks is increasing rapidly and span from large enterprises to the critical infrastructure (CINF) networks. Due to the potential severe damage and cost experienced by a victim nation, CINF networks have been intentionally targeted intentionally and have suffered from significant losses when successfully exploited.

In general, attacks on CINF networks occur in multiple stages. Consequently, detecting a single intrusion does not necessarily indicate the end of the attack as the attack could have progressed far deeper into the network. Accordingly, individual attack footprints are insignificant in an isolated manner, because each is usually part of a more complex multi-step attack. That is, it takes a sequence of steps to form an attack path toward a target in the network. Researchers have investigated several attack path analysis methods for identifying attacker's required effort (e.g., number of paths to a target and the cost and time required to compromise each path) to diligently estimate risk levels. However, traditional techniques fail to consider important features and provide incomplete solutions for addressing real attack scenarios. For example, some traditional techniques only consider the topological connection between stepping stones to measure the difficulty of reaching a target. As another example, some traditional techniques only assume some predefined attacker skill set to estimate the path complexity. In reality, an attacker's capabilities and knowledge of the enterprise network evolve along attack paths to the target.

In an effort to defend against cyber-attacks, AAGs can be generated, which represent potential lateral movements of adversaries within computer networks. An AAG can be used to understand how a computer network can be hacked and undesirable consequences that can result. Accordingly, AAGs can be described as an important tool in developing anti-hacker defenses. For example, an AAG can be used to identify the most vulnerable components within a computer network, and can be used to evaluate fixes of vulnerabilities that the AAG reveals (e.g., by fixing a limited number of issues, any adversary attack on the computer network, or on certain components in the computer network can be stopped).

By definition, AAGs structure data as a graph that includes vertices (nodes) and edges between vertices, a vertex representing an entity and an edge representing a relationship between entities. Consequently, graph processing has gained relevance in the fields of non-relational databases and analytics platforms. Graph processing can include performance problems on traditional hardware (e.g., central processing units (CPUs), graphics processing units (GPUs)), which can result from irregular memory accesses and computational intensity inherent in graph processing. That is, graph processing presents technical challenges in that it is resource-intensive. For example, AAGs are relatively large in size, particularly for large, complex enterprise networks, which requires significant memory and processing power for graph processing of an AAG. This is complicated by the fact that, in cyber-security, AAGs are frequently generated and processed for cyber-security analytics to keep up with the dynamics of enterprise networks. Resource-intensive graph processing presents other technical challenges, such as hindering scalability.

In view of the above context, implementations of the present disclosure are directed to AAG differencing to represent changes in enterprise networks. More particularly, implementations of the present disclosure present multiple models for representing differences between two or more AAGs and provide for resource-efficient computation of the differences. AAG differencing representations of the present disclosure provide the basis for more advanced difference-based analytics, which can be used to reason about system evolution, measure the effect of taking different protective steps, and identify the implication of newly discovered vulnerabilities or tactics. It may also be used to compare AAGs coming from different parts of an enterprise network, or of different enterprise networks.

In further detail, the difference between different AAGs corresponding to different versions of an enterprise network (system) is a focus of interest. In some implementations, an alignment between the elements (i.e., nodes and edges) of two or more AAGs is defined, and models (data objects) are provided for representing and visualizing the differences (and similarities) between AAGs. As described in further detail herein, implementations of the present disclosure define an equivalence relation between the elements of different AAGs and enables resource-efficient (in terms of technical resources (processing, memory) expended) alignment of the elements of different AAGs. After aligning elements of AAGs, a compact representation of the similarities and differences between two or more AAGs is generated in linear time based on the size of the AAGs.

Accordingly, and as described in further detail herein, the differenced AAGs of the present disclosure enable analysis of potential remedial measures to be time- and resource-efficiently performed to select one or more remedial measures for execution within the enterprise network. Time- and resource-efficiencies are realized in that a differenced graph identifies differences between AAGs, reducing the time and resources required to process discern changes to an AAG in response to a stimulus (e.g., execution of a remedial action).

In some examples, AAG differencing of the present disclosure can be realized within an agile security platform that considers attack complexity within an interconnected cyber infrastructure with a variety of attack paths to comprehensively address real attack scenarios. It is contemplated, however, that AAG differencing of the present disclosure can be realized in any appropriate cyber-security platform.

In general, the agile security platform provides a cyber-threat analysis framework based on characterizing adversarial behavior in a multi-stage cyber-attack process. As described in further detail herein, how a threat proceeds within a network is investigated using an AAG and all possible attack stages are identified. In some implementations, each stage can be associated with network attributes. Using a holistic view of threat exposure provided by AAGs, attack techniques and tactics are incorporated into stepping stones found in AAGs.

In further detail, the cyber-threat analysis framework adds context to each attack stage using a real-world knowledge base of adversary tactics and techniques to more comprehensively characterize progression along the attack path. In some implementations, an attack path analysis model identifies a level of difficulty in taking a path by considering the complexity of the path, the skill set of the attacker, and the like. Implementations of the present disclosure provide a path hardness that is measured in terms of a capability of the attacker and challenges. The insight into the level of difficulty of an attack path in the network helps security administrators to pinpoint critical paths and prioritize path hardening actions.

As described herein, the agile security platform enables continuous cyber and enterprise-operations alignment controlled by risk management. The agile security platform improves decision-making by helping enterprises to prioritize security actions that are most critical to their operations. In some examples, the agile security platform combines methodologies from agile software development lifecycle, IT management, development operations (DevOps), and analytics that use artificial intelligence (AI). In some examples, agile security automation bots continuously analyze attack probability, predict impact, and recommend prioritized actions for cyber risk reduction. In this manner, the agile security platform enables enterprises to increase operational efficiency and availability, maximize existing cyber-security resources, reduce additional cyber-security costs, and grow organizational cyber resilience.

As described in further detail herein, the agile security platform provides for discovery of IT/OT supporting elements within an enterprise, which elements can be referred to as configuration items (CI). Further, the agile security platform can determine how these CIs are connected to provide a CI network topology. In some examples, the CIs are mapped to processes and services of the enterprise, to determine which CIs support which services, and at what stage of an operations process. In this manner, a services CI topology is provided.

In some implementations, the specific vulnerabilities and improper configurations of each CI are determined and enable a list of risks to be mapped to the specific IT/OT network of the enterprise. Further, the agile security platform of the present disclosure can determine what a malicious user (hacker) could do within the enterprise network, and whether the malicious user can leverage additional elements in the network such as scripts, CI configurations, and the like. Accordingly, the agile security platform enables analysis of the ability of a malicious user to move inside the network, namely, lateral movement within the network. This includes, for example, how a malicious user could move from one CI to another CI, what CI (logical or physical) can be damaged, and, consequently, damage to a respective service provided by the enterprise.

FIG. 1 depicts an example architecture 100 in accordance with implementations of the present disclosure. In the depicted example, the example architecture 100 includes a client device 102, a network 106, and a server system 108. The server system 108 includes one or more server devices and databases (e.g., processors, memory). In the depicted example, a user 112 interacts with the client device 102.

In some examples, the client device 102 can communicate with the server system 108 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client device 102 over the network 106). In accordance with implementations of the present disclosure, and as noted above, the server system 108 can host an agile security platform.

In the example of FIG. 1, an enterprise network 120 is depicted. The enterprise network 120 represents a network implemented by an enterprise to perform its operations. In some examples, the enterprise network 120 represents on-premise systems (e.g., local and/or distributed), cloud-based systems, and/or combinations thereof. In some examples, the enterprise network 120 includes IT systems and OT systems. In general, IT systems include hardware (e.g., computing devices, servers, computers, mobile devices) and software used to store, retrieve, transmit, and/or manipulate data within the enterprise network 120. In general, OT systems include hardware and software used to monitor and detect or cause changes in processes within the enterprise network 120 as well as store, retrieve, transmit, and/or manipulate data. In some examples, the enterprise network 120 includes multiple assets. Example assets include, without limitation, users 122, computing devices 124, electronic documents 126, and servers 128.

In some implementations, the agile security platform is hosted within the server system 108, and monitors and acts on the enterprise network 120, as described herein. More particularly, and as described in further detail herein, one or more AAGs representative of the enterprise network are generated in accordance with implementations of the present disclosure. For example, the agile security platform detects IT/OT assets and generates an asset inventory and network maps, as well as processing network information to discover vulnerabilities in the enterprise network 120. The agile security platform executes AAG differencing of the present disclosure based on the network information.

In some examples, the agile security platform provides one or more dashboards, alerts, notifications and the like to cyber-security personnel that enable the cyber-security personnel to react to and remediate security relevant events. For example, the user 112 can include a cyber-security expert that views and responds to dashboards, alerts, and/or notifications of the agile security platform using the client device 102.

In some examples, the agile security platform operates over multiple phases. Example phases include an asset discovery, anomaly detection, and vulnerability analysis phase, a cyber resilience risk analysis phase, and a cyber resilience risk recommendation phase.

With regard to the asset discovery, anomaly detection, and vulnerability analysis phase, discovering what vulnerabilities exit across the vertical stack and the relevant use cases is imperative to be conducted from the enterprise IT to the control systems. A focus of this phase is to generate the security backlog of issues, and potential remediations.

Rather than managing each technology layer separately, the agile security platform addresses lateral movements across the stack. Through devices, communication channels (e.g., email, TCP/IP), and/or operation systems, vulnerabilities are addressed within the context of a service (e.g., a service that the enterprise offers to customers), and a cyber kill chain to a target in the operation vertical, generating operation disturbance by manipulation of data. The notion of a CI assists in mapping dependencies between IT/OT elements within a configuration management DB (CMDB). A so-called security CI (SCI) maps historical security issues of a certain managed security element and is mapped into a security aspect of a digital twin.

As a result, a stack of technologies is defined, and is configured in a plug-in reference architecture (replaceable and extensible) manner. The stack addresses different aspects of monitoring, harvesting, and alerting of information within different aggregations views (dashboards) segmented according to owners and relevant IT and security users. An example view includes a health metric inserted within the dashboard of an enterprise application. In some examples, the health metric indicates the security condition of the underlying service and hence, the reliability of the provided data and information. Similar to risks that can be driven by labor, inventory, or energy, security risk concern can be presented and evaluated in the operations-level, drilled-through for additional transparency of the issue, and can be optimally remediated by allocating investments to automation or to security and IT personal with adequate operations awareness.

With regard to the cyber resilience risk analysis phase, each vulnerability may have several remediations, and each has a cost associated with it, either per internal personnel time, transaction, service, or retainer, as well as the deferred cost of not acting on the issue. A focus of this phase is to enable economical decision-making of security investments, either to be conducted by the IT and security team or directly by automation, and according to risk mitigation budget.

In further detail, observing a single-issue type and its remediations does not reflect the prioritization between multiple vulnerabilities. Traditional systems are based on global risk assessment, yet the context in which the SCI is part of is missing. The overall risk of a process matters differently for each enterprise. As such, remediation would occur according to gradual hardening of a process according to prioritization, driven in importance and responsibility by the enterprise, not by gradual hardening of all devices, for example, in the organization according to policy, without understanding of the impact on separated operational processes. Hardening of a system should be a decision of the enterprise to drive security alignment with the enterprise.

In addition, as the system is changed by gradual enforcement and hardening, new issues are detected and monitored. Hence, making a big bang decision may be not relevant to rising risks as they evolve. Prioritization according to value is the essence of this phase. It is a matter of what is important for the next immediate term, according to overall goals, yet considering changes to the environment.

With regard to the cyber resilience risk recommendation phase, a focus is to simplify approved changes and actions by proactive automation. In traditional systems, the action of IT remediation of security issues is either done by the security team (such as awareness and training), by creating a ticket in the IT service system (call for patch managements), and/or by tools that are triggered by security and monitored by IT (automatic deployment of security policies, change of authentication and authorization, self-service access control management, etc.). Some operations can be conducted in a disconnected mode, such as upgrading firmware on an IoT device, in which the operator needs to access the device directly. Either automated or manual, by IT or by security, or by internal or external teams, the entire changes are constantly assessed by the first phase of discovery phase, and re-projected as a metric in a context. Progress tracking of these changes should also occur in a gradual manner, indicating maintenance scheduling on similar operational processes, hence, driving recommendations for frequent actions that can be automated, and serve as candidates to self-managed by the operations owners and systems users.

In the agile security platform, acting is more than automating complex event processing (CEP) rules on alerts captured in the system logs and similar tools. Acting is started in areas highlighted according to known patterns and changing risks. Pattern detection and classification of events for approved automation processes (allocated transactions budget), are aimed at commoditization of security hardening actions in order to reduce the attention needed for prioritization. As such, a compound backlog and decision phase, can focus further on things that cannot be automated versus those that can. All issues not attended yet are highlighted, those that are handled by automation are indicated as such, and monitored to completion, with a potential additional value of increasing prioritization due to changing risks impact analysis.

Figure 2:
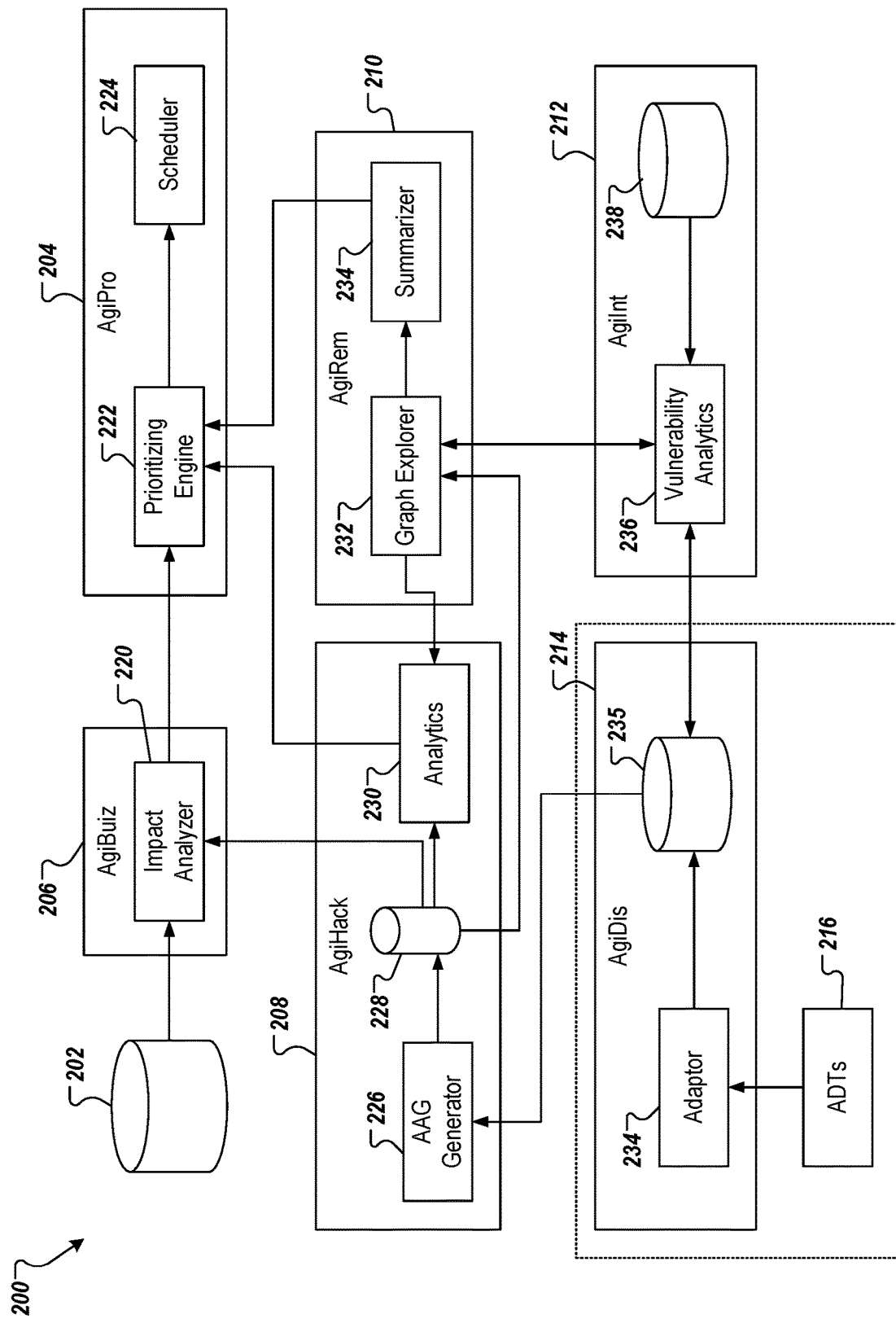
FIG. 2 depicts an example conceptual architecture of an agile security platform.

FIG. 2 depicts an example conceptual architecture 200 of an agile security (AgiSec) platform. The conceptual architecture 200 depicts a set of security services of the AgiSec platform, which include: an agile security prioritization (AgiPro) service 204, an agile security business impact (AgiBuiz) service 206, an agile security remediation (AgiRem) service 210, an agile security hacker lateral movement (AgiHack) service 208, an agile security intelligence (AgiInt) service 212, and an agile security discovery (AgiDis) service 214. The conceptual architecture 200 also includes an operations knowledge base 202 that stores historical data provided for an enterprise network (e.g., the enterprise network 120).

In the example of FIG. 2, the AgiDis service 214 includes an adaptor 234, and an asset/vulnerabilities knowledge base 235. In some examples, the adaptor 234 is specific to an asset discovery tool (ADT) 216. Although a single ADT 216 is depicted, multiple ADTs can be provided, each ADT being specific to an IT/OT site within the enterprise network. Because each adaptor 234 is specific to an ADT 216, multiple adaptors 234 are provided in the case of multiple ADTs 216.

In some implementations, the AgiDis service 214 detects IT/OT assets through the adaptor 234 and respective ADT 216. In some implementations, the AgiDis service 214 provides both active and passive scanning capabilities to comply with constraints, and identifies device and service vulnerabilities, improper configurations, and aggregate risks through automatic assessment. The discovered assets can be used to generate an asset inventory, and network maps. In general, the AgiDis service 214 can be used to discover assets in the enterprise network, and a holistic view of network and traffic patterns. More particularly, the AgiDis service 214 discovers assets, their connectivity, and their specifications and stores this information in the asset/vulnerabilities knowledge base 235. In some implementations, this is achieved through passive network scanning and device fingerprinting through the adaptor 234 and ADT 216. The AgiDis service 214 provides information about device models.

In the example of FIG. 2, the AgiInt service 212 includes a vulnerability analytics module 236 and a threat intelligence knowledge base 238 (e.g., CVE, CAPEC, CWE, iDefence API, vendor-specific databases). In some examples, the AgiInt service 212 discovers vulnerabilities in the enterprise network based on data provided from the AgiDis service 214. In some examples, the vulnerability analytics module 236 processes data provided from the AgiDis service 214 to provide information regarding possible impacts of each vulnerability and remediation options (e.g., permanent fix, temporary patch, workaround) for defensive actions. In some examples, the vulnerability analytics module 236 can include an application programming interface (API) that pulls out discovered vulnerabilities and identifies recommended remediations using threat intelligence feeds. In short, the AgiInt service 212 maps vulnerabilities and threats to discovered IT/OT assets. The discovered vulnerabilities are provided back to the AgiDis service 214 and are stored in the asset/vulnerabilities knowledge base 235 with their respective assets.

In the example of FIG. 2, the AgiHack service 208 includes an analytical attack graph (AAG) generator 226, an AAG database 228, and an analytics module 230. In general, the AgiHack service 208 generates AAGs using the resource-efficient AAG generation, and evaluates hacking exploitation complexity. In some examples, the AgiHack service 208 understands attack options, leveraging the vulnerabilities to determine how a hacker would move inside the network and identify targets for potential exploitation. The AgiHack service 208 proactively explores adversarial options and creates AAGs representing possible attack paths from the adversary's perspective.

In further detail, the AgiHack service 208 provides rule-based processing of data provided from the AgiDis service 214 to explore all attack paths an adversary can take from any asset to move laterally towards any target (e.g., running critical operations). In some examples, multiple AAGs are provided, each AAG corresponding to a respective target within the enterprise network. Further, the AgiHack service 208 identifies possible impacts on the targets. In some examples, the AAG generator 226 uses data from the asset/vulnerabilities knowledge base 236 of the AgiDis service 214, and generates an AAG. In some examples, the AAG graphically depicts, for a respective target, all possible impacts that may be caused by a vulnerability or network/system configuration, as well as all attack paths from anywhere in the network to the respective target. In some examples, the analytics module 230 processes an AAG to identify and extract information regarding critical nodes, paths for every source-destination pair (e.g., shortest, hardest, stealthiest), most critical paths, and critical vulnerabilities, among other features of the AAG. If remediations are applied within the enterprise network, the AgiHack service 208 updates the AAG.

In the example of FIG. 2, the AgiRem service 210 includes a graph explorer 232 and a summarizer 234. In general, the AgiRem service 210 provides remediation options to avoid predicted impacts. For example, the AgiRem service 210 provides options to reduce lateral movement of hackers within the network and to reduce the attack surface. The AgiRem service 210 predicts the impact of asset vulnerabilities on the critical processes and adversary capabilities along kill chain/attack paths and identifies the likelihood of attack paths to access critical assets and prioritizes the assets (e.g., based on shortest, easiest, stealthiest). The AgiRem service 210 identifies remedial actions by exploring attack graph and paths. For example, the AgiRem service 210 can execute a cyber-threat analysis framework that characterizes adversarial behavior in a multi-stage cyber-attack process, as described in further detail herein.

In further detail, for a given AAG (e.g., representing all vulnerabilities, network/system configurations, and possible impacts on a respective target) generated by the AgiHack service 208, the AgiRem service 210 provides a list of efficient and effective remediation recommendations using data from the vulnerability analytics module 236 of the AgiInt service 212. In some examples, the graph explorer 232 analyzes each feature (e.g., nodes, edges between nodes, properties) to identify any condition (e.g., network/system configuration and vulnerabilities) that can lead to cyber impacts. Such conditions can be referred to as issues. For each issue, the AgiRem service 210 retrieves remediation recommendations and courses of action (CoA) from the AgiInt service 212, and/or a security knowledge base (not shown). In some examples, the graph explorer 232 provides feedback to the analytics module 230 for re-calculating critical nodes/assets/paths based on remediation options. In some examples, the summarizer engine 234 is provided as a natural language processing (NLP) tool that extracts concise and salient text from large/unstructured threat intelligence feeds. In this manner, the AgiSec platform can convey information to enable users (e.g., security teams) to understand immediate remedial actions corresponding to each issue.

In the example of FIG. 2, the AgiBuiz service 206 includes an impact analyzer 220. In general, the AgiBuiz service 206 associates services that are provided by the enterprise with IT/OT assets, generates a security map, identifies and highlights risks and possible impacts on enterprise operations and industrial processes, and conducts what-if prediction analyses of potential security actions remediations on service health levels. In other words, the AgiBuiz service 206 identifies risk for each impact predicted by the AgiHack service 208. In some examples, the impact analyzer 220 interprets cyber risks and possible impacts (e.g., financial risk) based on the relative importance of each critical asset and its relative value within the entirety of the enterprise operations. The impact analyzer 220 processes one or more models to compare the financial risks caused by cyber-attacks with those caused by system unavailability due to shutdown time for replacing/patching critical assets.

In the example of FIG. 2, the AgiPro service 204 includes a prioritizing engine 222 and a scheduler 224. In some implementations, the AgiPro service 204 prioritizes the remediation recommendations based on their impact on the AAG size reduction and risk reduction on the value. In some examples, the AgiPro service 204 determines where the enterprise should preform security enforcement first, in order to overall reduce the risks discovered above, and evaluate and probability to perform harm based on the above lateral movements by moving from one CI to another. In some examples, the AgiPro service 204 prioritizes remedial actions based on financial risks or other implications, provides risk reduction recommendations based on prioritized remediations, and identifies and tracks applied remediations for risks based on recommendations.

In some examples, the prioritizing engine 222 uses the calculated risks (e.g., risks to regular functionality and unavailability of operational processes) and the path analysis information from the analytics module 230 to prioritize remedial actions that reduce the risk, while minimizing efforts and financial costs. In some examples, the scheduler 224 incorporates the prioritized CoAs with operational maintenance schedules to find the optimal time for applying each CoA that minimizes its interference with regular operational tasks.

As introduced above, cyber-threat analysis for a computer network leverages one or more AAGs. In some examples, an AAG is generated by a cyber-security platform, such as the AgiSec platform described herein. In mathematical terms, an AAG can be described as a directed graph modeled as AAG (V, E) with a set of nodes $V=\{v_1, \ldots, v_n\}$ and a set of edges $E=\{e_1, \ldots, e_m\}$ connecting nodes together, where $|V|=n$ and $|E|=m$.

Figure 3:
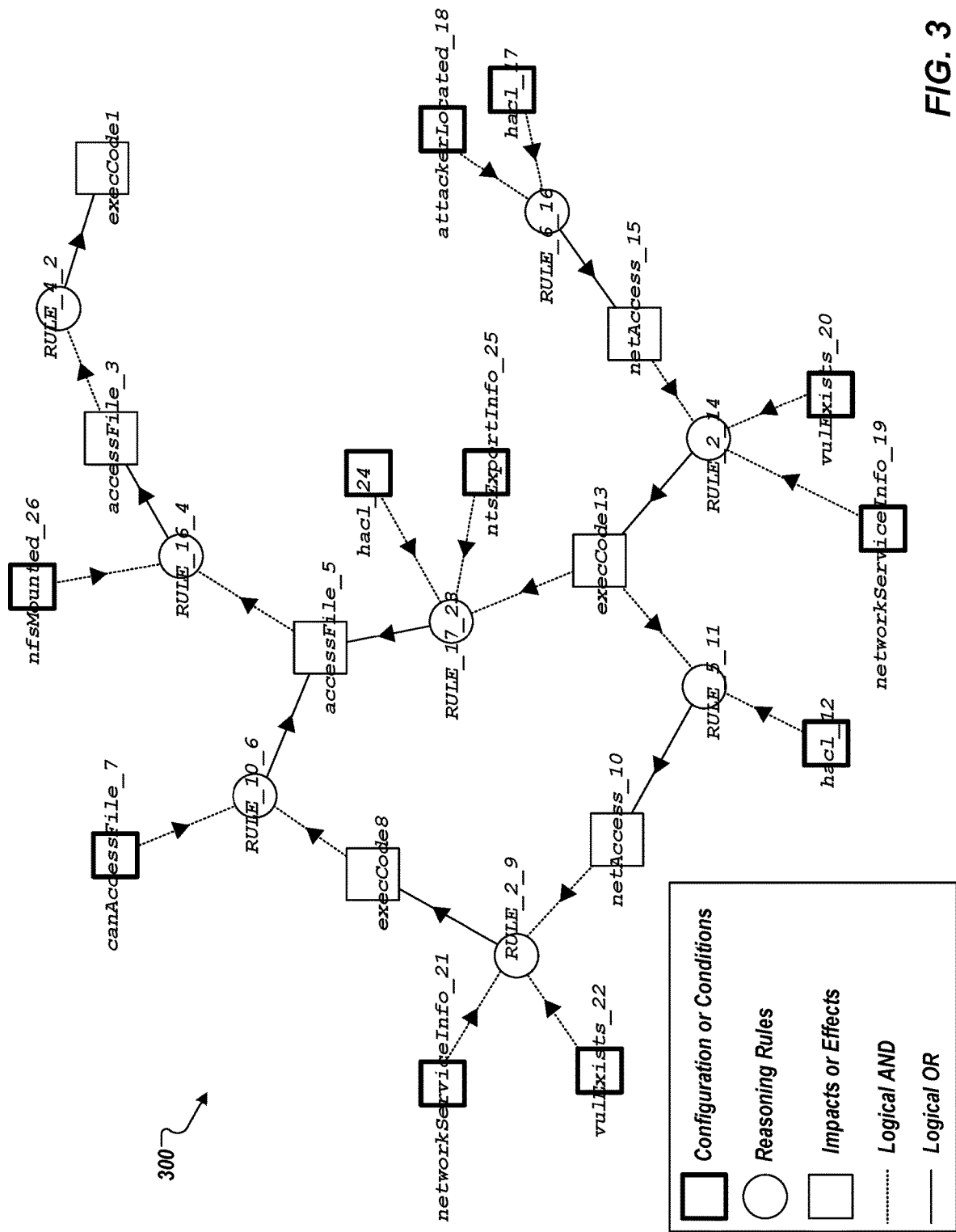
FIG. 3 depicts an example portion of an example analytical attack graph (AAG) to illustrate implementations of the present disclosure.

FIG. 3 depicts an example portion 300 of an example AAG to illustrate implementations of the present disclosure. As depicted in the example of FIG. 3, the AAG can include different node types to show how a set of network and system configurations result in unauthorized actions to specific targets. The example portion 300 is depicted in a database structure (e.g., Neo4j graph database structure). Nodes in an AAG are of different types: circular nodes representing system or network configurations that are the conditions that provide possibilities for actions by an attacker; circle-shaped nodes representing reasoning rules that represent the attack methodology leveraged by an attacker to achieve a particular goal; and square nodes that represent an impact as a sub-goal for a certain action an attacker could take. The AAG includes two types of edges: configuration-to-rule edges that represent logical AND (i.e., all configuration conditions have to be true to cause the impact; and rule-to-impact edges that represent logical OR (i.e., the impact happens if at least one rule is satisfied).

In general, the AAG is created by taking into account the configurations directed by some rules in order to make some impacts on the target network. In some examples, all configuration nodes, impact nodes, and rule nodes can be provided in sets $N_p$, $N_d$, $N_r$, respectively. Accordingly, $N_p=\{n_{p,j}|n_{p,j} \in V, \forall n_{p,j}$ is a configuration$\}$, $N_d=\{n_{d,j}|n_{d,j} \in V, \forall n_{d,j}$ is an impact$\}$, and $N_r=\{n_{r,j}|n_{r,j} \in V, \forall n_{r,j}$ is a rule$\}$. Consequently, the combination of these sets accounts for all vertices of the graph. In some examples, a configuration node is referred to herein as an input fact node indicating facts that are provided as input within a configuration. In some examples, impact nodes are referred to herein as derived fact nodes indicating a derived fact that results from applying one or more input facts and/or one or more derived facts to a rule.

AAGs can be used in cyber-threat analysis to determine attack paths of external attackers into and through a computer network. Use of AAGs in mitigating attacks on computer networks is described in further detail in commonly assigned U.S. application Ser. No. 16/554,846, entitled Generating Attack Graphs in Agile Security Platforms, and filed on Aug. 29, 2019, the disclosure of which is expressly incorporated herein by reference in the entirety for all purposes. Further, generation of AAGs is described in further detail in commonly assigned U.S. application Ser. No. 16/924,483, entitled Resource-efficient Generation of Analytical Attack Graphs, and filed on Jul. 9, 2020, the disclosure of which is expressly incorporated herein by reference in the entirety for all purposes.

To provide further context for implementations of the present disclosure, the AAG model presented in MulVAL will be briefly discussed. MulVAL can be described as an automatic end-to-end AAG generation framework. In general, MulVAL takes a specification, such as, but not limited to, MITRE Common Vulnerabilities and Exposures (CVE), describing the configuration of an enterprise network and rules that depict how an attacker can exploit the system configurations to advance in the enterprise network towards a target goal. MulVAL uses datalog as a specification language. In datalog, logical and physical entities of the enterprise network are formally modelled by datalog predicates; n-ary relations between entities are defined by datalog relations; and attack rules are modelled as datalog derivation rules in a datalog program. Derivation rules define preconditions (set of predicates connected by logical 'and') that, if met, derive new predicates. The specification of the predicates and derivation rules can be referred to as the datalog program of the system (enterprise network).

For purposes of illustration, a non-limiting example is introduced in Listing 1, below, which shows a specification of an example datalog program for an enterprise network (system).

```
##Predicates
.decl domainUser(_user: UserFqdn, _domain: Domain)
.decl groupContains(_group: GroupFqdn, _principal: Principal)
.decl isUser(_user: UserFqdn)
.decl localGroup(_host: Host, _groupName: GroupName, _groupFqdn: GroupFqdn)
.decl userInLocalGroup(_host: Host, _groupName: GroupName, _user: UserFqdn)
.decl isUser(_user: UserFqdn, rule_id: String)
.decl groupContainsDirect(_group: GroupFqdn, _principal: Principal)
##Attack Rules
groupContains (Group, Principal): -
groupContainsDirect (Group, Principal). #rule label: 28
isUser(User):-domainUser(User,_). #rule label: 80
userInLocalGroup(Host,GroupName,User):-
localGroup(Host,GroupName,GroupFqdn),groupContains(GroupFqdn,User ,_),isUser(User,_). #rule label: 25
```

Listing 1: Example Datalog Program

The example datalog program of Listing 1 lists seven predicates. Each predicate is a function that maps objects of different types to a Boolean value. For example, the predicate domainUser maps objects of type user and objects of type Domain to True if the user belongs to the domain, and False otherwise.

The example datalog program of Listing 1 lists three attack rules. The first attack rule indicates that a predicate groupContains is derived from the predicate groupContainsDirect (with the corresponding objects). The third attack rule indicates that three precondition predicates: isUser, localGroup, groupContains derive the predicate userInLocalGroup (with the corresponding objects). Each rule has a unique identifier (id). For example, 28 for the first attack rule and 25 for the third attack rule.

The system configuration (e.g., instance of hosts, users, privileges on host, etc.) is provided as an array of facts (also referred to as grounds), each fact associated with a predicate of the datalog program.

Table 1: Example Input Facts for domainUser Table 1, below, lists four input facts of the isDomain predicate.

TABLE 1

| Example Input Facts for domainUser | |
|---|---|
| <ADMINISTRATOR>@CYBER.LOCAL | CYBER.LOCAL |
| BERTHA.DAVIES@CYBER.LOCAL | CYBER.LOCAL |
| BRANDON.DAVIS@CYBER.LOCAL | CYBER.LOCAL |
| DANIELLE.HINTON@CYBER.LOCAL | CYBER.LOCAL |

The listed user-domain pairs represent mappings that are True. Combinations (of user and domain) that are not listed in the input facts are considered False, until proven otherwise (i.e., derived by a rule).

MulVAL uses a datalog solver on the program specification to check whether there exists an attack path from the input facts to a target goal. It does this by iteratively applying the derivation rules on facts until either reaching a target goal (a path exists) or reaching a fixed point, from which no new fact can be derived. In this case, no attack path to the target exists and the system is considered to be secure.

The derivation process from the grounded facts to the target goals is represented in the resulting AAG. An AAG is provided as a data object that records nodes and edges between nodes, described herein. The data object underlying an AAG can be processed to generate a visual representation, a graph, of the AAG.

In further detail, MulVAL generates an AAG that shows the derivation of grounded facts by the application of rules. Formally, the AAG is defined as: $AAG=(N_r, N_p, N_d, E, L, Args, G)$, where $N_r$, $N_p$, $N_d$ are the sets of nodes (rules (r), input facts (p), and derived facts (d), respectively), E is a set of edges that connect from facts to derivation rules (precondition) and from derivation rules to derived facts, L is a mapping from a node (i.e., an input fact, a derived fact, a rule) to its label (i.e., the predicate or rule that it is associated with), Args is a mapping of facts to their arguments (i.e., objects they are associated with), and $G \in N_d$ describes the target goal (e.g., crown jewel that may be a target for hackers). N denotes the union of all node elements in the graph (i.e., $N=N_r \cup N_p \cup N_d$). In some examples, primitive nodes and derived nodes (i.e., fact nodes) are denoted by $N_f$, where $N_f=N_p \cup N_d$. Every fact node in the graph is labeled with a logical statement in the form of a predicate applied to its arguments. In some examples, Args and L are separately encoded. For example, a configuration c={"DomainUser", "BERTHA.DAVIES@CYBER. LOCAL","CY BE R. LOCAL" } can be encoded as $N_p$={node_1}; L(node_1)= "DomainUser"; Arg s(node_1)=["BERTHA. DAVIES@CYBER. LOCAL", "CYBER. LOCAL"].

Every element of the AAG is uniquely identifiable. Each fact (input fact, derived fact) node is uniquely defined by its arguments and predicate label (i.e., no two nodes may have the same label and arguments). As described in further detail herein, a unique identifier (index) for each fact node can be provided based on this information. Every rule node is uniquely defined by its label, preconditions and derived fact. As also described in further detail herein, a unique index for each rule node can be provided based on this information. The AAG size can be defined as the number of nodes and edges in the AAG.

In some implementations, each node and each edge are uniquely identified by a respective identifier that is generated by encoding. Each identifier enables the respective node or edge to be indexed within dictionaries and/or libraries in a time- and resource-efficient manner. In some examples, each fact node includes a respective identifier that is determined based on a concatenation of the predicate label and the arguments of the fact node. In some examples, each rule node includes a respective identifier that is determined based on a concatenation of the rule label, the unique identifier(s) of predicate node(s) (i.e., one or more fact nodes input to the rule node), and the unique identifier(s) of derivative node(s) (i.e., one or more derived fact nodes output by the rule node). In some examples, lexicographical ordering is used for the precondition nodes and/or derived nodes to provide the order used in the concatenation. In some examples, each edge includes a respective unique identifier that is determined based on a concatenation of the unique identifier of the source node and the unique identifier of the target node. In some implementations, a concatenation is the encoding used to uniquely identify a respective node. In some implementations, each concatenation is processed through a hash function (e.g., a deterministic hash function) to generate a hash value, the hash value being the encoding used to uniquely identify a respective node.

Figure 4:
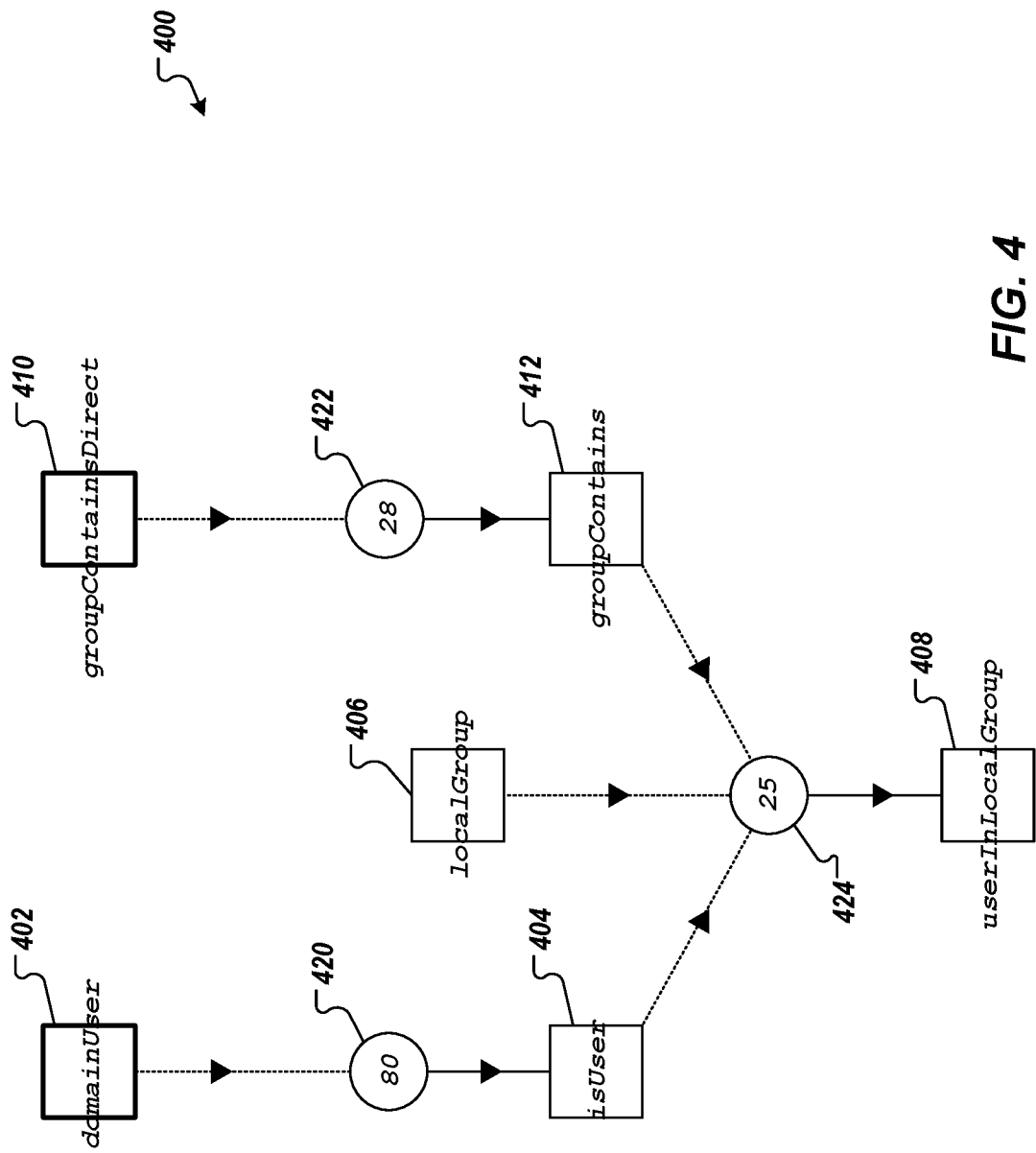
FIG. 4 depicts an example AAG based on the examples of Listing 1 and Table 1 below.

FIG. 4 depicts an example AAG 400 based on the examples of Listing 1 and Table 1. In the example of FIG. 4, squares represent predicates (fact nodes) and circles represent rules (rule nodes). The AAG 400 includes predicate nodes, which include fact nodes 402, 406, 410 and derived fact nodes 404, 408, 412. The AAG 400 also includes rule nodes 420, 422, 424. The AAG 400 presents the derivation order between predicates and includes fact, derived fact, and rule nodes. Each node is associated with its label and arguments (the arguments are absent FIG. 4 for clarity of presentation). For example, the domainUser fact node 402 correspond to the first row of Table 1. Initially, three facts are provided. These appear as predicate nodes 402, 406, 410 with no incoming transitions: domainUser, localGroup and groupContainsDirect. MulVal derives the fact nodes 404, 412 from domainUser and groupContainsDirect, by applying rule 80 and rule 28, respectively. The resulting nodes 404, 412 isUser and groupcontains participate in the derivation of the fact UserInLocalGroup, represented as derived fact node 408.

In accordance with implementations of the present disclosure, and as described in further detail herein, differencing of AAGs is provided. In some implementations, AAG differencing is based on two AAGs. In some implementations, AAG differencing is based on more than two AAGs (also referred to herein as many AAGs). Graph alignment between multiple AAGs is provided to enable differencing.

In further detail, graph alignments is based on equivalence relations between the elements of multiple AAGs. In some examples, equivalence is determined by comparing an index (unique identifier) of an element in $AAG_i$ to indexes (unique identifiers) of elements in $AAG_j$. For example, if the index of the element in $AAG_i$ matches an index of an element in $AAG_j$, an equivalence relationship exists (i.e., the element in $AAG_i$ has an equivalent element in $AAG_j$). Based on these equivalence relations, an alignment is defined between the elements of multiple AAGs. For example, $AAG_i$ and $AAG_j$ denote two attack graphs and $n_i \in AAG_i$ and $n_j \in AAG_j$ denote two nodes in the respective AAGs. An equivalence relation is defined between fact nodes (i.e., $N_f$) of $AAG_i$ and $AAG_j$ as follows:

$$EP: N_{f,AAG_i} \times N_{f,AAG_j} =$$
$$\{(n_i, n_j) | n_i \in AAG_i, n_j \in AAG_j, L(n_i) = L(n_j) \wedge Args(n_i) = Args(n_j)\}$$

In view of the above relationship, two nodes are considered equivalent, if and only if (iff) both of the nodes are associated with the same predicate and have the same arguments. Further, an equivalence relation is defined between rule nodes of $AAG_i$ and $AAG_j$ as follows:

$$ER: N_{r,AAG_i} \times N_{r,AAG_j} = \{(n_i, n_j) | n_i \in AAG_i, n_j \in AAG_j, L(n_i) = L(n_j) \wedge \forall n'_i \cdot (n'_i, n'_i) \in E_{AAG_i} \wedge \exists n'_j \cdot (n'_j, n'_j) \in E_{AAG_j} \wedge$$
$$(n'_i, n'_j) \in EP \wedge \forall n'_j \cdot (n_j, n'_j) \in E_{AAG_j} \wedge \exists n'_i \cdot (n_i, n'_i)$$
$$\in E_{AAG_i} \wedge (n'_i, n'_j) \in EP \wedge \forall n'_i \cdot (n'_i, n_i) \in E_{AAG_i} \wedge \exists n'_j \cdot$$
$$(n'_j, n_j) \in E_{AAG_j} \wedge (n'_i, n'_j) \in EP \wedge \forall n'_j \cdot (n'_j, n_j)$$
$$\in E_{AAG_j} \wedge \exists n'_i \cdot (n'_i, n_i) \in E_{AAG_i} \wedge (n'_i, n'_j) \in EP\}$$

In view of the above relationship, two rule nodes are considered equivalent, iff both rule nodes are associated with the same derivation rule, are preconditioned with equivalent nodes, and result in equivalent derived nodes.

Continuing, $e_i \in AAG_i$ and $e_j \in AAG_j$ denote two edges in $AAG_i$ and $AAG_j$, respectively, and $e_{i,src}$ and $e_{i,trg}$ denote the source and target nodes of $e_i$, respectively. An equivalence relation between edges is defined as follows:

$$EE: E_{AAG_i} \times E_{AAG_j} = \{(e_i, e_j) | e_i \in E_{AAG_i}, e_j \in E_{AAG_j},$$
$$(e_{i,src}, e_{j,src}) \in ER \cup EP \wedge (e_{i,trg}, e_{j,trg}) \in ER \cup EP\}$$

In view of the above relationship, equivalent edges have equivalent source and target nodes.

When comparing multiple AAGs, implementations of the present disclosure align equivalent elements between the AAGs. To this end, a theorem can be provided, which provides that, when comparing two AAGs, each element (node, edge) can have at most one equivalent node. A respective proof is provided in that fact (and derived fact) nodes are unique in each AAG. Therefore, when comparing two AAGs, each fact node can have at most one equivalent node in another graph (that shares the same arguments and label). Further, because equivalence between rule nodes is defined by the equivalence of their precondition and derived facts (and their labels), a rule node can have at most a single equivalent node. Similarly, each edge may have at most one equivalent edge.

As an immediate corollary, there exists a unique alignment between multiple AAGs. That is, because each element has at most one alignment (in each of the other graphs), the unique alignment is obtained by aligning equivalent elements to their corresponding elements on the other graphs. All other elements are left without an alignment.

In addition to defining equivalence relationships between elements of multiple AAGs, implementations of the present disclosure define semantics of AAG differencing. To this end, types of difference operations between elements of AAGs are provided as:

Node addition
Node removal

Edge addition
Edge removal

In further detail, implementations of the present disclosure formally define the difference operations. For example, and as also used above, $AAG_i$ and $AAG_j$ denote two AAGs. A nodeAdditions function takes $AAG_i$ and $AAG_j$ as input and returns all nodes of the second AAG (second argument) that do not have an equivalent node in the first AAG (first argument). The nodeAdditions function can be formalized as:

$$\text{nodeAdditions}(AAG_i, AAG_j) = \{n_j | n_j \in N_{AAG_j} \text{ s.t.}, \neg \exists n_i \in N_{AAG_i} \text{ s.t.}, (n_i, n_j) \in ER \cup EP\}$$

where s. t. indicates subject to.

A nodeRemovals function takes $AAG_i$ and $AAG_j$ as input and returns all nodes of the first AAG (first argument) that do not have an equivalent node in the second AAG (second argument). The nodeRemovals function can be formalized as:

$$\text{nodeRemovals}(AAG_i, AAG_j) = \{n_i | n_i \in N_{AAG_i} \text{ s.t.}, \neg \exists n_j \in N_{AAG_j} \text{ s.t.}, (n_i, n_j) \in ER \cup EP\}$$

An edgeAdditions function takes $AAG_i$ and $AAG_j$ as input and returns all edges of the second graph (second argument) that do not have an equivalence edge in the first graph (first argument). The edgeAdditions function can be formalized as:

$$\text{edgeAdditions}(AAG_i, AAG_j) = \{e_j | e_j \in E_{AAG_j} \text{ s.t.}, \neg \exists e_i \in E_{AAG_i} \text{ s.t.}, (e_i, e_j) \in EE\}$$

An edgeRemovals function take $AAG_i$ and $AAG_j$ as input and returns all edges of the first graph (first argument) that do not have an equivalence edge in the second graph (second argument). The edgeRemovals function can be formalized as:

$$\text{edgeRemovals}(AAG_i, AAG_j) = \{e_i | e_i \in E_{AAG_i} \text{ s.t.}, \neg \exists e_j \in E_{AAG_j} \text{ s.t.}, (e_i, e_j) \in EE\}$$

In some implementations, a modified function is absent. Instead, any modification is modelled using addition (of the new fact/rule) and removal (of the old fact/rule) functions.

As introduced above, implementations of the present disclosure provide a graph difference representation using a Differenced Analytical Attack Graph (DAAG) model. The DAAG model defines a data object (also referred to herein as a DAAG object) that records a DAAG and that can be used to provide a compact graph-based representation (DAAG graph) depicting similarities and differences between AAGs. In this manner, a user (e.g., security analyst) can readily visualize the similarities and differences between AAGs from a DAAG graph displayed in a user interface (UI), for example.

In some implementations, the DAAG graph includes multiple attributes, each attribute representing a similarity or a difference between AAGs. Each element within a DAAG graph can have an attribute of the multiple attributes. Example attributes can include, without limitation, color and line type. For example, a first color indicates an addition, a second color indicates a removal, and a third color indicates no change. It is contemplated, however, that implementations of the present disclosure can be realized using any appropriate attribute.

In general, the DAAG graph can be described as an attributed AAG that includes the elements of multiple AAGs and uses attributes to classify elements that appear only in $AAG_i$, elements that appear only $AAG_j$, and elements that appear in both. To achieve this, implementations of the present disclosure provide an attribute function from the nodes and edges to attributes. The attribute function can be formalized as:

$$\text{AttributeN}: N \rightarrow \text{Int}; \text{AttributeN}(n) = \begin{cases} 0, & \text{if } n \in \text{nodeAddition}(AAG_i, AAG_j) \\ 1, & \text{if } n \in \text{nodeRemoval}(AAG_i, AAG_j) \\ 2, & \text{else} \end{cases}$$

$$\text{AttributeE}: E \rightarrow \text{Int}; \text{AttributeE}(e) = \begin{cases} 0, & \text{if } e \in \text{edgeAddition}(AAG_i, AAG_j) \\ 1, & \text{if } e \in \text{edgeRemoval}(AAG_i, AAG_j) \\ 2, & \text{else} \end{cases}$$

where 0, 1, and 2 represent respective attribute values. For example, 0 indicates a first color, 1 indicates a second color, and 2 indicates a third color. As another example, 0 indicates a first line type, 1 indicates a second line type, and 2 indicates a third line type.

The DAAG model for $AAG_i$ and $AAG_j$ can be defined as:

$$DAAG(AAG_i, AAG_j) = (N_r, N_p, N_d, E, L, Args, G, ColorN, ColorE),$$

$$\text{where } N_r = N_{r,G_i} \cup N_{r,G_j}, N_p = N_{p,G_i} \bigcup N_{p,G_j}, N_d = N_{d,G_i} \cup N_{d,g_j},$$

$$E = E_{G_i} \cup E_{G_j}, L = L_i \cup L_j, Args = Args_i \cup Args_j, G = G_i \cup G_j$$

In accordance with implementations of the present disclosure, the DAAG object (used to generate a respective DAAG graph) is constructed in linear time with respect to the sizes of the compared (input) AAGs. In constructing the DAAG object, it can be noted that any fact node is uniquely identified by its labels and arguments, any derivation rule node is uniquely defined by its label, preconditions and derived nodes, and any edge is uniquely identified by its source and target. In constructing a DAAG object, dictionaries are initialized to hold the AttributeN and AttributeE mappings.

Iterations are executed over all node elements of $AAG_{i,N_p}$, $AAG_{i,N_d}$, $AAG_{j,N_p}$, $AAG_{j,N_d}$ using respective unique identifiers (indexes) and each fact node is mapped to the a value (e.g., 0, 1, 2) in AttributeN. When iterating over a node, if the node does not appear in AttributeN, the node is mapped to 0, if the node is taken from $AAG_i$ and $AAG_j$, respectively, it is mapped to 1, and is mapped to 2 otherwise. Iterations are executed over $AAG_{i,N_r}$, $AAG_{i,N_r}$ and follow similar logic. Iterations are executed over each edge in $AAG_{i,E}$, $AAG_{j,E}$ following the same logic when mapping edges to attributes in AttributeE.

In accordance with implementations of the present disclosure, construction of the DAAG object iterates each of the elements once and encodes each element in a constant time. In some examples, the number of rule preconditions is treated as a constant. Adding a node to the attribute dictionary requires O(1) complexity. Edges are processed in a similar manner. Consequently, the time complexity for constructing the DAAG object is executed and is linear in $O(|AAG_i|+|AAG_j|)$.

Figure 5:
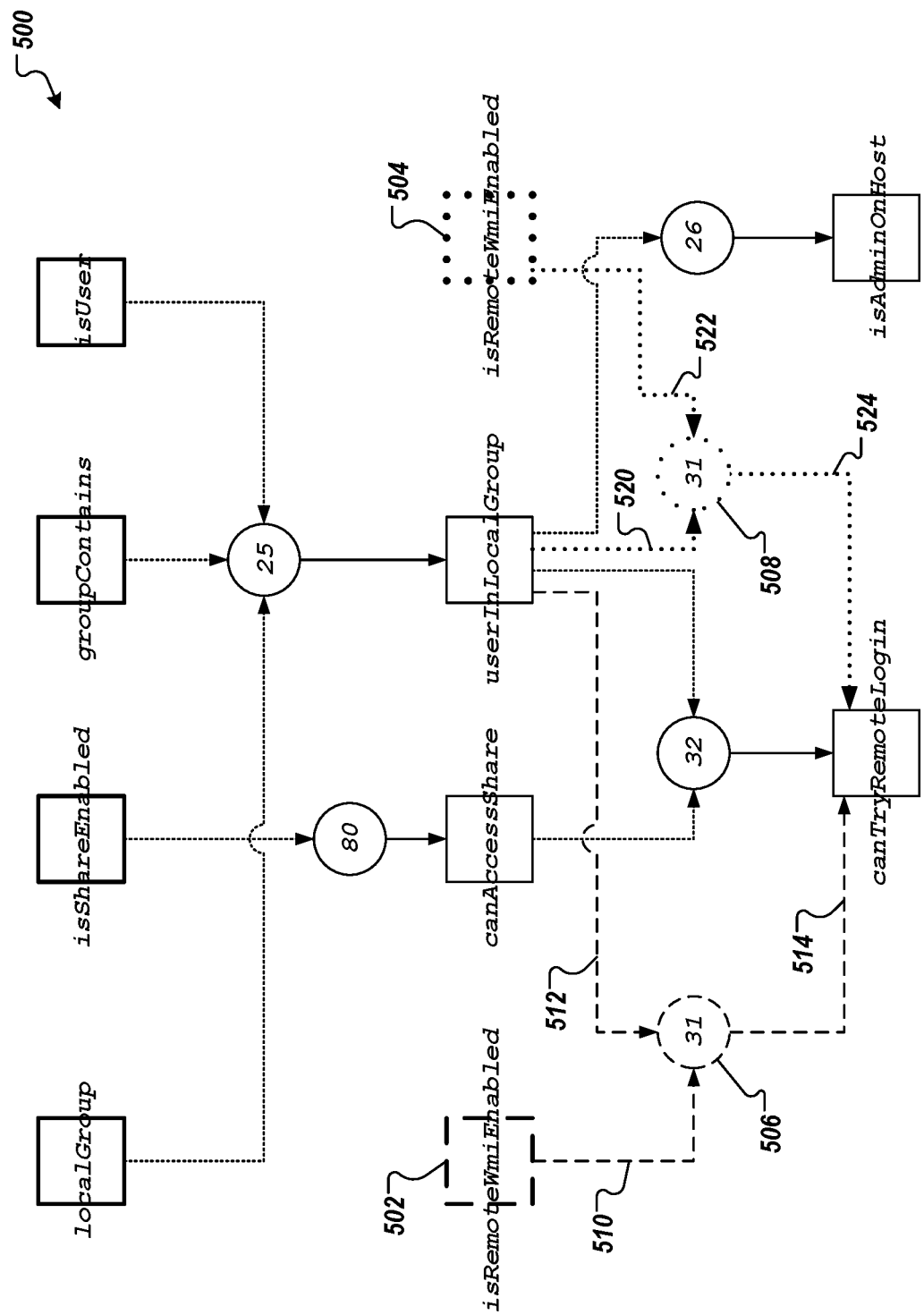
FIG. 5 depicts an example differenced AAG (DAAG) graph in accordance with implementations of the present disclosure.

FIG. 5 depicts an example DAAG graph 500 in accordance with implementations of the present disclosure. The example DAAG graph 500 is constructed based on two AAGs, where a single fact, represented by fact nodes 502, 504, is modified in one of the AAGs. Also, a single rule, represented by rule nodes 506, 508, is modified in view of the modified fact. That is, the difference in fact node is propagated to rule nodes that are preconditioned by the modified fact (and reflected by a removal and an addition of a rule node). In the example of FIG. 5, the predicate node that results from the rule does not change and thus, the difference is not propagated further. The difference between the AAGs is reflected by node removals (old versions indicated as fact node 502 and rule node 506 in dashed lines) and node additions (new versions indicated as fact node 504 and rule node 508 in dotted lines). The difference is also reflected by edge removals (old edges indicated as edges 510, 512, 514 in dashed lines) and by edge additions (new edges indicated as edges 520, 522, 524 in dotted lines).

Implementations of the present disclosure extend the DAAG object to a many DAAG (MDAAG) object. In some examples, a MDAAG is constructed based on three or more underlying AAGs. To this end, the node and edge attribute functions used to generate a DAAG object are replaced with node and edge index labeling functions. As described in further detail herein, the index labeling functions enable a resulting MAAG graph to depict, which of the underlying AAGs include each of the entities provided for in the MAAG graph.

In further detail, $AAG_1$, $AAG_2$, . . . , $AAG_m$ denote m AAGs. An indexing function is defined from the nodes and edges to a set of indices, each index denoting a respective AAG in which an element appears. In some implementations, equivalence relations from the elements of two AAGs are expanded to m AAGs. A function ID: N→Int is provided, which maps entities of each AAG to unique IDs. In some examples, the ID function maps a predicate to a unique integer based on its predicate label, its argument types, its argument values, and their order. In some examples, the ID function maps a rule to a unique integer based on its label and precondition and derives node IDs.

Continuing, $AAG_{UG_1,G_2,\ldots,G_m}$ denotes the unification of $AAG_1$, $AAG_2$, . . . , $AAG_m$. For example:

$$AAG_{\cup G_i} = \left( \bigcup_{i \in [1..m]} Nr_{AAG_i}, \bigcup_{i \in [1..m]} Np_{AAG_i}, \bigcup_{i \in [1..m]} Nf_{AAG_i}, \right.$$
$$\left. \bigcup_{i \in [1..m]} E_{AAG_i}, \bigcup_{i \in [1..m]} L_{AAG_i}, \bigcup_{i \in [1..m]} Args_{AAG_i}, \bigcup_{i \in [1..m]} G_{AAG_i} \right)$$

In some implementations, the ID function induces a partition of the nodes of $AAG_{UG_1,G_2,\ldots,G_m}$ to equivalence classes: $E=\{e_1, e_2, \ldots, e_n\}$, where each equivalence class is defined by the ID of its elements, that is, for each $n_1, n_2 \in e_i$, $ID(n_1)=ID(n_2)$, where $n_1$, $n_2$ are either predicate nodes or rule nodes. In some implementations, $E_{N_r}$, $E_{N_d}$, $E_{N_p}$, $E_{G_i}$ denote the equivalence classes of the derivation rules, facts, derived facts, and goals defined by ID over $AAG_1$, $AAG_2$, . . . , $AAG_m$, respectively. Further, $E_E$ denotes the edges induced by collapsing nodes in equivalence classes $AAG_{UG_1,G_2,\ldots,G_m}$, i.e., $E_E=\{(ID(e_{src}), ID(e_{trg})) | \forall e \in \cup_{i \in [1 \ldots m]} E_{AAG_i}\}$.

In accordance with implementations of the present disclosure, the MAAG object (and a resulting MAAG graph) represents the union of many AAGs (i.e., three or more AAGs). This structure includes the elements of all AAGs, but joins equivalent elements by applying the ID over elements. The following formulation is provided:

$$MAAG(AAG_1, AAG_2, \ldots, AAG_m) = (N_r, N_p, N_d, E, L, Args, G),$$
$$\text{where } N_r = E_{N_r}, N_p = E_{N_p}, N_d = E_{N_d}, E = E_E,$$
$$\bigcup_{i \in [1..m]} L_{AAG_i}, \bigcup_{i \in [1..m]} Args_{AAG_i}, G = E_G$$

where $E_{N_r}$, $E_{N_d}$, $E_{N_p}$, $E_e$, $E_G$ are as described above.

In the formulation above, $N_p = E_{N_r}$ indicates that a single node per equivalence class is created, where the label and arguments of one (any) of the class nodes is used as representative. This also follows for $N_d$ and $N_r$. Edges are unlabeled. Instead, an edge per equivalence class (of edges) is created in $E_E$. In some examples, L is defined over the graph nodes and not equivalence classes of nodes. In some examples, L(e) represents the label of an equivalence class. It can be noted that L is well defined, because all nodes of an equivalence class share same label. Further, Args(e) returns the arguments of an equivalence class and is well defined by the same reasoning.

In some implementations, the exact formulation of the ID function remains unspecified. However, requirements that the ID function must adhere to are specified. In this manner, engineers are provided flexibility, when implementing the MAAG object construction, as described in further detail herein.

In further detail, $AAG_1$, $AAG_2$, . . . , $AAG_m$ denote m AAGs, and MAAG graph denotes a resulting graph representation. A many differenced analytical attack (MDAAG) object is provided by enriching a MAAG object with indices that specify, for each element, the AAGs that it appears in. In further detail, each node in the MAAG object represents an equivalence class of a set of concert nodes, each belonging to a single graph. In some examples, $n_{set}$ denotes the set associated with a node in the MAAG object, and ind denotes the indices of graphs that include these nodes. Similarly, $e_{set}$, ind denotes the set graph indices associated with edge e of the MAAG graph.

In some implementations, NodeIndices and EdgeIndices functions are provided as:

NodeIndices$_p$:$N_p$→set(Int),NodeIndices$_p(n)=\{i \in ind (n_{set})\}$

NodeIndices$_r$:$N_r$→set(Int),NodeIndices$_r(n)=\{i \in ind (n_{set})\}$

NodeIndices$_d$:$N_d$→set(Int),NodeIndices$_d(n)=\{i \in ind (n_{set})\}$

EdgeIndices$_e$:$E$→set(Int),EdgeIndices$_e(n)=\{i \in ind (e_{set})\}$

NodeIndices denotes the union of the above functions. Accordingly, the MDAAG object can be represented as:

$$MDAAG(AAG_1, AAG_2, \ldots, AAG_m) =$$
$$(N_r, N_p, N_d, E, L, Args, G, NodeIndice, EdgeIndices),$$

-continued where $N_r = E_{N_r}, N_p = E_{N_p}, N_d = E_{N_d}, E = E_E,$ $$L = \bigcup_{i \in [1 \ldots m]} L_i, Args = \bigcup_{i \in [1 \ldots m]} Args_i, G = E_G$$

In constructing the MDAAG object, and as noted above, $AAG_1, AAG_2, \ldots, AAG_m$ denote m AAGs, and ID indicates the identity function. The MDAAG object is constructed by unifying all predicates, rules, goals and edges. Each node element (predicate or rule) is iterated over and mapped to its ID. The nodes of the MDAAG object are defined, one node per unique ID. Each MDAAG node is defined by copying any of the elements that are associated with its ID. To create the MDAAG edges, each of the MAAG edges is iterated over and the ID function is applied over its source and target. To create the indexing functions, dictionaries are provided that map each equivalence class (be it of a node or an edge) to the graph indices that include an element in the equivalence class. The dictionaries are updated as iterations are executed over the elements of the AAGs.

With regard to complexity, and as described above, construction of the MDAAG object includes iterations over each of the elements in each of the AAGs once and encodes each element in a constant time. Adding a node to the attribute dictionary requires O(1). Edges are processed in a similar manner. Thus, the overall time complexity is $O(\Sigma_{i \in [1 \ldots m]} |AAG_i|)$. It can also be seen that the space complexity is linear in the $O(\Sigma_{i \in [1 \ldots m]} |AAG_i|)$.

Figure 6:
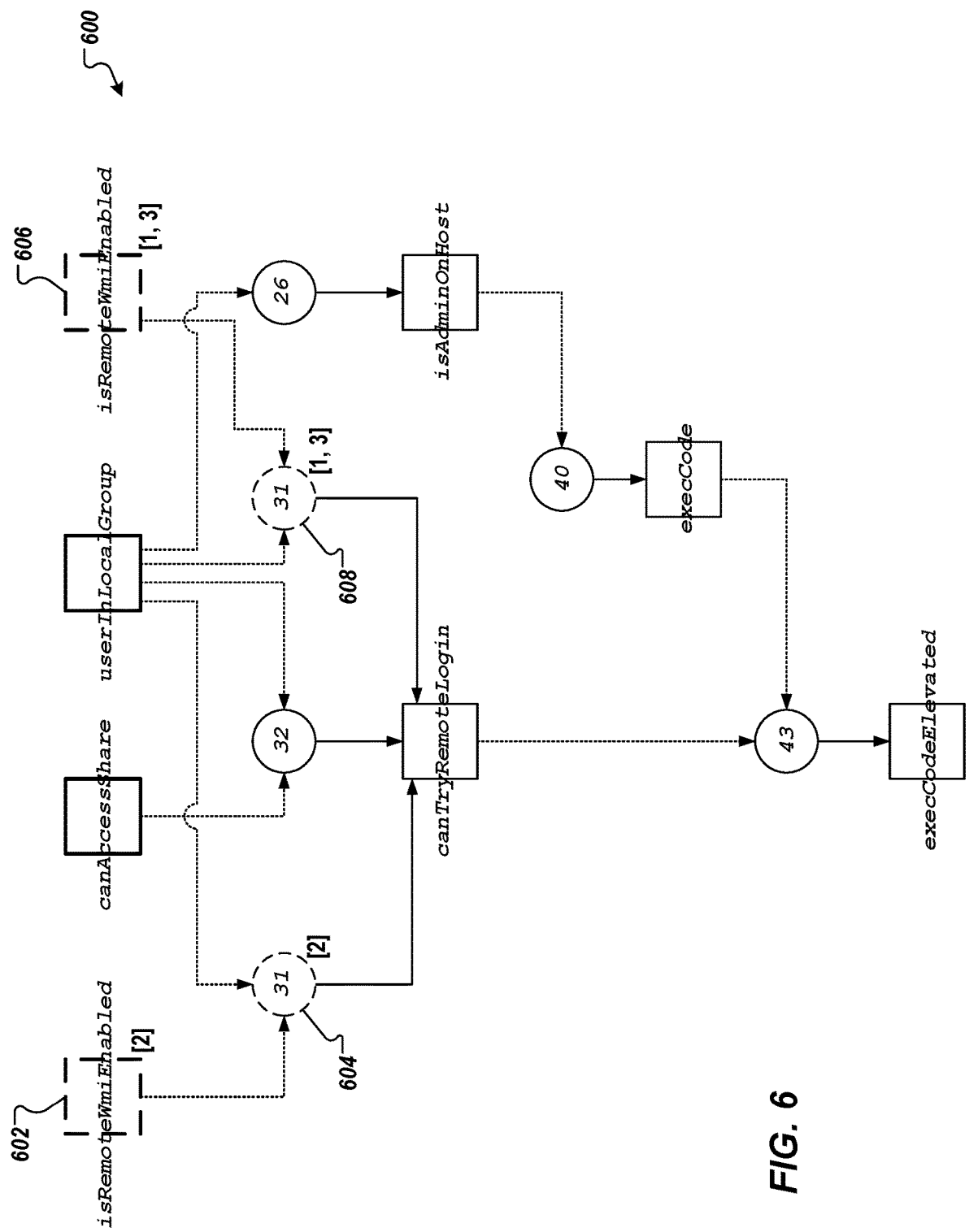
FIG. 6 depicts an example many DAAG (MDAAG) graph in accordance with implementations of the present disclosure.

FIG. 6 depicts an example MDAAG graph 600 resulting from an underlying MDAAG object in accordance with implementations of the present disclosure. The example MDAAG graph 600 is a result of comparing three AAGs: $AAG_1, AAG_2, AAG_3$. In this example, $AAG_1, AAG_2$ are identical to the AAGs underlying the example of FIG. 5. Also in this example, $AAG_3$ is a replica of $AAG_1$. Nodes that do not appear in all the of the AAGs are marked with an attribute (e.g., dashed lines) to represent the differences across the many AAGs. In some examples, nodes that are different between AAGs are associated with an AAG index label indicating one or more AAGs that each is included in. For example, in the example of FIG. 6, a fact node 602 and a rule node 604 are each associated with an AAD index label of [2] indicating that each is present in $AAG_2$, and a fact node 604 and a rule node 606 are each associated with an AAG index label of [1, 3] indicating that each is present in both $AAG_1$ and $AAG_2$.

In accordance with implementations of the present disclosure, the MDAAG object, and thus the resulting MDAAG graph, includes all elements of all AAGs from which it is constructed. For large AAGs, this can be burdensome in generating the respective MDAAG graph (i.e., in terms of time and technical resources expended) and the resulting MDAAG graph may be less insightful than desired (e.g., due to overcrowding of graphically depicted elements). To address this, implementations of the present disclosure provide for MDAAG projections, which provide a filtered view on a respective MDAAG graph. An MDAAG projection reduces technical burden in generating a MDAAG graph and enables viewers to gain more insights into the differences and similarities between the different AAGs. For example, a MDAAG projection avoids a clutter of graph elements, and is useful in focusing on the elements of a subset of the AAGs.

In further detail, given a set of AAG indices $\Omega$, a projection operation is provided, which removes elements from the MDAAG that are not associated with any of the AAGs indicated in $\Omega$. The projection operation enables one to easily obtain a view of the MDAAG graph with respect to a subset of the AAGs that the MDAAG graph is developed from. The projection operation can be formally defined as:

$$\text{Proj}(\text{MDAAG}(AAG_1, AAG_2, \ldots, AAG_m), \Omega) = (N_r, N_p, N_d, E, L, Args, G, \text{NodeIndices}, \text{EdgeIndices}),$$

where:

$N_r = \{e | e \in E_{N_r} \land NodeIndices(e) \cap \Omega \neq \emptyset\},$ $N_p = \{e | e \in E_{N_p} \land NodeIndices(e) \cap \Omega \neq \emptyset\},$ $N_d = \{e | e \in E_{N_d} \land NodeIndices(e) \cap \Omega \neq \emptyset\}, E =$ $\{e | e \in E_E \land NodeIndices(e_{Src}) \cap \Omega \neq \emptyset \land NodeIndices(e_{trg}) \cap \Omega \neq \emptyset\},$ and $$L = \bigcup_{i \in \Omega} L_i, Args = \bigcup_{i \in \Omega} Args_i, E_G \cap (N_p \cup N_d)$$

Computing the MDAAG projection can be done in O(|MDAAG|×m), where |MDAAG| is the number of nodes and edges in the MDAAG graph. More particularly, computing the MDAAG projection with respect to the set of indices $\Omega$ requires a single traversal of the graph elements ($N_r, N_p, N_d, E$) and a dictionary lookup per element (O(1)) for its element indices set (i.e., in NodeIndices$_r$, NodeIndices$_p$, NodeIndices$_d$, EdgeIndices). Per element, computing set intersection (i.e., of $\Omega$ and ind(elem)), requires O(|$\Omega$|) <O(m). Consequently, a total time complexity of O(|MDAAG|×m) is provided. Further, the space complexity is linear in $O(\Sigma_{i \in [1 \ldots m]} |AAG_i|)$.

Implementations of the present disclosure can be applied in multiple use cases. Although example use cases are discussed herein, it is contemplated that implementations of the present disclosure can be realized in any appropriate use case. In general, the AAG differencing models of the present disclosure enable users (e.g., cyber-security analysts) to navigate and compare different AAGs, representing the state of the cyber posture of an enterprise system as it evolves over time or under simulation.

As one example use case, a security control simulator for cyber digital twins can be considered. An example of such a security control simulator is described in U.S. Prov. App. No. 62/983,040, filed on Feb. 28, 2020, the disclosure of which is expressly incorporated herein by reference in the entirety. In some examples, the security control simulator applies different security controls over an enterprise network and updates the facts, from which an AAG is constructed. Here, a security control can also be referred to as a remedial action, and can be executed to reduce cyber security risk in an enterprise network. For example, a remedial action (e.g., update, patch) can be executed to eliminate a vulnerability within the enterprise network. A first AAG can be provided based on the state of the enterprise network before application of the security controls and a second AAG can be provided based on the state of the enterprise network after application of the security controls. Implementations of the present disclosure enable an alignment to be defined between the first AAG and the second AAG resulting from different security controls. The proposed representation can be used to easily compare alternative, sometimes competing security controls, view the effect of aggregating several security controls, and identify areas in the AAG that are only removed by some security controls, or cannot be removed at all.

In another example use case, multiple AAGs of an enterprise network can be provided over different periods of time. With the MDAAG model of the present disclosure, for example, users can construct a single representation to study differences and similarities of the AAGs. For example, a user could view the types of vulnerabilities that persist over time or focus on new vulnerabilities that appear at different points of time. Further, a user one may use a MDAAG projection to navigate a unified view and study the differences and similarities between periods of interest.

In another example use case, implementations of the present disclosure can be integrated into a tool that enables experts, for example, to modify a knowledge base of facts, from which the AAG was constructed. After changing the knowledge base, the tool reconstructs the AAG accordingly. The AAG differencing of the present disclosure is used to highlight the elements of the DAAG model and/or MDAAG model that were removed, added or remained unchanged.

Figure 7:
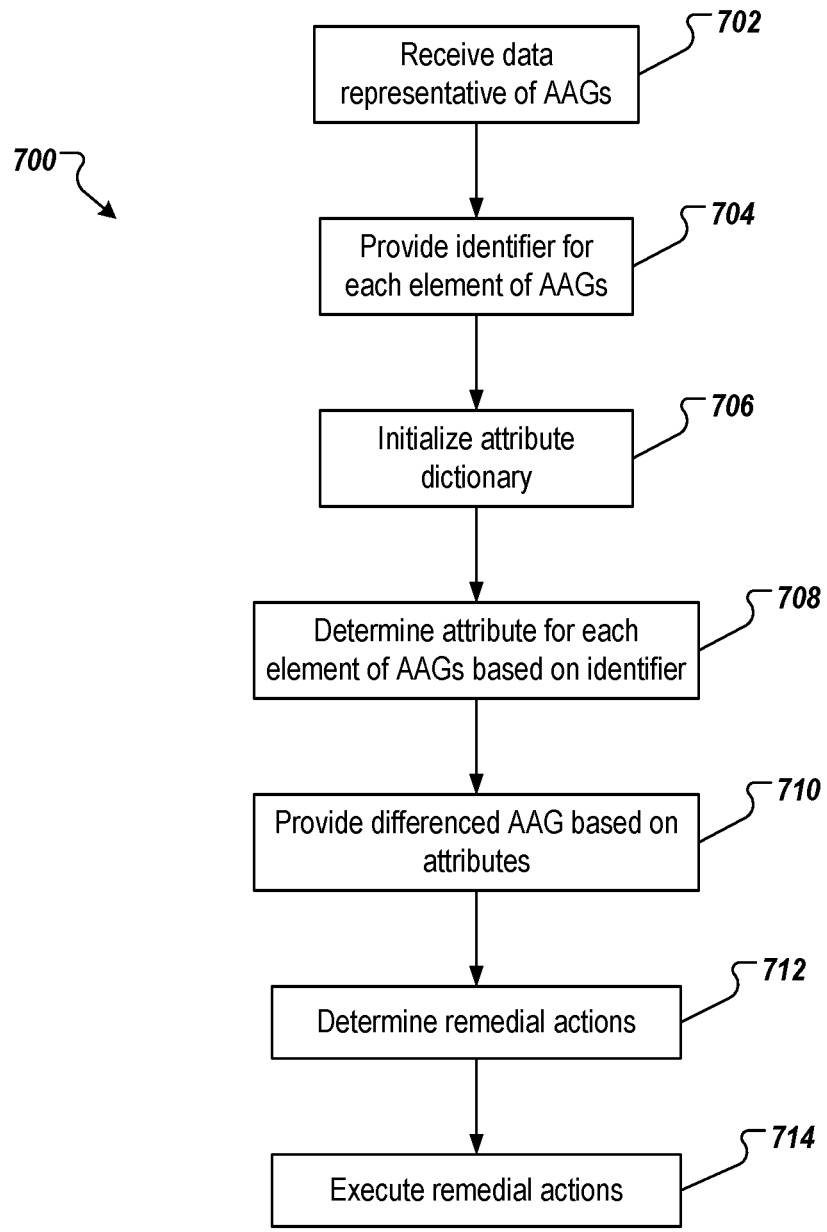
FIG. 7 depicts an example process that can be executed in accordance with implementations of the present disclosure.

FIG. 7 depicts an example process 700 that can be executed in accordance with implementations of the present disclosure. In some implementations, the example process 700 may be performed using one or more computer-executable programs executed using one or more computing devices.

Data representative of two or more AAGs is received (702). For example, and as described herein, a set of AAGs can be generated, each AAG being represented as a data object include data representative of nodes (e.g., fact nodes, rule nodes) and edges. In some examples, MulVAL is used to generate each of the AAGs based on a datalog program and a configuration. The datalog program defines predicates and rules representative of the enterprise network and the configuration provides a set of input facts to be processed by the datalog program to generate derived facts. The datalog program processes the configuration (as input) to provide an AAG (as output). In some examples, each datalog program is associated with a respective instance of the enterprise network, representing the enterprise network at the respective instant. For example, a first datalog program can be provided for the enterprise network at a first time, and a second datalog program can be provided for the enterprise network at a second time. As another example, a first datalog program can be provided for the enterprise network before application of one or more security controls, and a second datalog program can be provided for the enterprise network prior to application of the one or more security controls.

An identifier is provided for each element of each of the two or more AAGs (704). For example, and as described in detail herein, a unique identifier for each element within each AAG is provided based on encoding data associated with respective elements. In some examples, each identifier is unique within a respective AAG, but might not be unique between multiple AAGs. For example, a unique identifier for an element can be included for each of multiple AAGs, if the element is present in each of the multiple AAGs.

An attribute dictionary is initialized (706). For example, an attribute dictionary is instantiated as a data object to store a mapping that associates elements of the AAGs to attribute values. An attribute is determined for each element of each of the two or more AAGs (708). For example, and as described in detail herein, iterations are executed over each element to determine an attribute value for a respective element. For example, 0, 1, and 2 represent respective attribute values. In an example, in which attribute is color, 0 indicates a first color, 1 indicates a second color, and 2 indicates a third color. In an example, in which attribute is line type, 0 indicates a first line type, 1 indicates a second line type, and 2 indicates a third line type. A differenced AAG is provided based on the attributes (710). For example, and as described in detail herein, a DAAG graph is provided as a graphical representation of a DAAG, in which elements are graphically depicted using their respective attributes. As example is depicted in FIG. 5.

A set of remedial actions is determined (710). For example, and as described herein, the differenced AAG can represent a result that would be achieved by applying a remedial action (also referred to as security control herein). If the result is determined to be acceptable (e.g., eliminates a vulnerability, does not result in a new vulnerability, does not conflict with another remedial action), the remedial action can be included in the set of remedial actions. One or more remedial actions are executed (712). In accordance with implementations of the present disclosure, a remedial action is executed to mitigate risk resulting from a respective fact. For example, software can be updated or patched to eliminate a vulnerability.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for mitigating risk in an enterprise network based on analytical attack graphs (AAGs), each AAG representative of potential lateral movement within the enterprise network, the method being executed by one or more processors and comprising:

receiving data representative of two or more AAGs, each AAG comprising a first set of nodes, a second set of nodes, a third set of nodes, a first set of edges, and a second set of edges, the first set of nodes comprising configuration nodes, each configuration node representing a configuration of a component of the enterprise network, the second set of nodes comprising rule nodes, each rule node representing a method available to an attacker of the enterprise network to move between components of the enterprise network, the third set of nodes comprising impact nodes, each impact node representing a result of one or more attack methods, the first set of edges comprising edges between configuration nodes and rule nodes that represent logical AND, the second set of edges comprising edges between rule nodes and impact nodes that represent logical OR;

providing an identifier for each element of each of the two or more AAGs, each identifier being unique within a respective AAG, at least one identifier being non-unique between the two or more AAGs;

determining an attribute value for each element of each of the two or more AAGs;

storing attribute value to element mappings in an attribute dictionary;

providing a differenced AAG based on the attribute value to element mappings in the attribute dictionary;

determining a set of remedial actions at least partially based on the differenced AAG; and executing one or more remedial actions in the set of remedial actions to reduce a cyber security risk to the enterprise network.

2. The computer-implemented method of claim 1, wherein providing a differenced AAG comprises:
aligning the two or more AAGs by identifying equivalent nodes and identifying equivalent edges between the two or more AAGs; and
executing a set of functions to provide a set of changed nodes and a set of changed edges.

3. The computer-implemented method of claim 2, wherein identifying nodes as equivalent nodes comprises determining that the nodes are associated with the same predicate and have the same arguments.

4. The computer-implemented method of claim 2, wherein identifying edges as equivalent edges comprises determining that the nodes have the same source node and the same target node.

5. The computer-implemented method of claim 2, wherein the set of functions comprises a node addition function, a node removal function, an edge addition function, and an edge removal function.

6. The computer-implemented method of claim 1, wherein each node and each edge of the differenced AAG is assigned an attribute based on a respective attribute value, the attribute visually representing a difference between the two or more AAGs in a visualization of the differenced AAG.

7. The computer-implemented method of claim 1, wherein the differenced AAG represents one or more differences between two AAGs.

8. The computer-implemented method of claim 1, wherein the differenced AAG represents one or more differences between three or more AAGs.

9. A non-transitory computer-readable storage medium coupled to one or more processors and having instructions stored thereon which, when executed by the one or more processors, cause the one or more processors to perform operations for mitigating risk in an enterprise network based on analytical attack graphs (AAGs), each AAG representative of potential lateral movement within the enterprise network, the operations comprising:
receiving data representative of two or more AAGs, each AAG comprising a first set of nodes, a second set of nodes, a third set of nodes, a first set of edges, and a second set of edges, the first set of nodes comprising configuration nodes, each configuration node representing a configuration of a component of the enterprise network, the second set of nodes comprising rule nodes, each rule node representing a method available to an attacker of the enterprise network to move between components of the enterprise network, the third set of nodes comprising impact nodes, each impact node representing a result of one or more attack methods, the first set of edges comprising edges between configuration nodes and rule nodes that represent logical AND, the second set of edges comprising edges between rule nodes and impact nodes that represent logical OR;
providing an identifier for each element of each of the two or more AAGs, each identifier being unique within a respective AAG, at least one identifier being non-unique between the two or more AAGs;
determining an attribute value for each element of each of the two or more AAGs;
storing attribute value to element mappings in an attribute dictionary;
providing a differenced AAG based on the attribute value to element mappings in the attribute dictionary;
determining a set of remedial actions at least partially based on the differenced AAG; and
executing one or more remedial actions in the set of remedial actions to reduce a cyber security risk to the enterprise network.

10. The non-transitory computer-readable storage medium of claim 9, wherein providing a differenced AAG comprises:
aligning the two or more AAGs by identifying equivalent nodes and identifying equivalent edges between the two or more AAGs; and
executing a set of functions to provide a set of changed nodes and a set of changed edges.

11. The non-transitory computer-readable storage medium of claim 10, wherein identifying nodes as equivalent nodes comprises determining that the nodes are associated with the same predicate and have the same arguments.

12. The non-transitory computer-readable storage medium of claim 10, wherein identifying edges as equivalent edges comprises determining that the nodes have the same source node and the same target node.

13. The non-transitory computer-readable storage medium of claim 10, wherein the set of functions comprises a node addition function, a node removal function, an edge addition function, and an edge removal function.

14. The non-transitory computer-readable storage medium of claim 9, wherein each node and each edge of the differenced AAG is assigned an attribute based on a respective attribute value, the attribute visually representing a difference between the two or more AAGs in a visualization of the differenced AAG.

15. The non-transitory computer-readable storage medium of claim 9, wherein the differenced AAG represents one or more differences between two AAGs.

16. The non-transitory computer-readable storage medium of claim 9, wherein the differenced AAG represents one or more differences between three or more AAGs.

17. A system, comprising:
a computing device; and
a computer-readable storage device coupled to the computing device and having instructions stored thereon which, when executed by the computing device, cause the computing device to perform operations for mitigating risk in an enterprise network based on analytical attack graphs (AAGs), each AAG representative of potential lateral movement within the enterprise network, the operations comprising:
receiving data representative of two or more AAGs, each AAG comprising a first set of nodes, a second set of nodes, a third set of nodes, a first set of edges, and a second set of edges, the first set of nodes comprising configuration nodes, each configuration node representing a configuration of a component of the enterprise network, the second set of nodes comprising rule nodes, each rule node representing a method available to an attacker of the enterprise network to move between components of the enterprise network, the third set of nodes comprising impact nodes, each impact node representing a result of one or more attack methods, the first set of edges comprising edges between configuration nodes and rule nodes that represent logical AND, the second set of edges comprising edges between rule nodes and impact nodes that represent logical OR;

providing an identifier for each element of each of the two or more AAGs, each identifier being unique within a respective AAG, at least one identifier being non-unique between the two or more AAGs;

determining an attribute value for each element of each of the two or more AAGs;

storing attribute value to element mappings in an attribute dictionary;

providing a differenced AAG based on the attribute value to element mappings in the attribute dictionary;

determining a set of remedial actions at least partially based on the differenced AAG; and executing one or more remedial actions in the set of remedial actions to reduce a cyber security risk to the enterprise network.

18. The system of claim 17, wherein providing a differenced AAG comprises:

aligning the two or more AAGs by identifying equivalent nodes and identifying equivalent edges between the two or more AAGs; and executing a set of functions to provide a set of changed nodes and a set of changed edges.

19. The system of claim 18, wherein identifying nodes as equivalent nodes comprises determining that the nodes are associated with the same predicate and have the same arguments.

20. The system of claim 18, wherein identifying edges as equivalent edges comprises determining that the nodes have the same source node and the same target node.

21. The system of claim 18, wherein the set of functions comprises a node addition function, a node removal function, an edge addition function, and an edge removal function.

22. The system of claim 18, wherein each node and each edge of the differenced AAG is assigned an attribute based on a respective attribute value, the attribute visually representing a difference between the two or more AAGs in a visualization of the differenced AAG.

23. The system of claim 17, wherein the differenced AAG represents one or more differences between two AAGs.

24. The system of claim 17, wherein the differenced AAG represents one or more differences between three or more AAGs.

* * * * *